US009254863B2

United States Patent
Kuwahara et al.

(10) Patent No.: US 9,254,863 B2
(45) Date of Patent: Feb. 9, 2016

(54) TORQUE DETECTING DEVICE AND ELECTRIC POWER STEERING DEVICE

(75) Inventors: Masaki Kuwahara, Fujisawa (JP); Takayuki Kobayashi, Fujisawa (JP); Kazuhiro Yoshida, Fujisawa (JP); Toshiyuki Onizuka, Fujisawa (JP); Takayoshi Sugawara, Fujisawa (JP); Nobuhiko Andou, Fujisawa (JP)

(73) Assignee: NSK Ltd., Tokyo (JP)

( * ) Notice: Subject to any disclaimer, the term of this patent is extended or adjusted under 35 U.S.C. 154(b) by 205 days.

(21) Appl. No.: 13/581,238

(22) PCT Filed: Mar. 21, 2012

(86) PCT No.: PCT/JP2012/001928
§ 371 (c)(1),
(2), (4) Date: Mar. 14, 2014

(87) PCT Pub. No.: WO2012/176358
PCT Pub. Date: Dec. 27, 2012

(65) Prior Publication Data
US 2014/0195117 A1  Jul. 10, 2014

(30) Foreign Application Priority Data

| Jun. 21, 2011 | (JP) | 2011-137118 |
| Jun. 21, 2011 | (JP) | 2011-137119 |
| Jun. 21, 2011 | (JP) | 2011-137120 |
| Sep. 14, 2011 | (JP) | 2011-201217 |
| Jan. 13, 2012 | (JP) | 2012-005502 |

(51) Int. Cl.
*G01L 3/00* (2006.01)
*B62D 5/04* (2006.01)
(Continued)

(52) U.S. Cl.
CPC ............. *B62D 5/0481* (2013.01); *B62D 5/049* (2013.01); *G01L 3/101* (2013.01); *G01L 3/105* (2013.01); *G01L 25/006* (2013.01)

(58) Field of Classification Search
CPC .......... G01L 25/00; G01L 25/003; G01L 3/00; G01L 3/10; G01L 3/101; G01L 3/105
USPC .................. 701/41, 42; 73/862.333, 862.334, 73/862.08
See application file for complete search history.

(56) References Cited

U.S. PATENT DOCUMENTS

| 4,840,073 A | * | 6/1989 | Aoki | ........................ G01L 3/102 |
| | | | | 324/209 |
| 5,062,306 A | * | 11/1991 | Gotoh | ..................... G01L 3/105 |
| | | | | 73/862.331 |

(Continued)

FOREIGN PATENT DOCUMENTS

| CN | 86 1 00634 A | 1/1987 |
| CN | 1576814 A | 2/2005 |

(Continued)

OTHER PUBLICATIONS

Japanese-language International Search Report (PCT/ISA/210) and Written Opinion (PCT/ISA/237) dated Jun. 12, 2012 (eight (8) pages).

(Continued)

*Primary Examiner* — Thomas G Black
*Assistant Examiner* — Sara Lewandroski
(74) *Attorney, Agent, or Firm* — Crowell & Moring LLP

(57) ABSTRACT

There is provided a torque detecting device for providing a highly accurate torque signal, and an electric power steering device using the torque detecting device. A torque sensor is provided with a first coil pair and a second coil pair, which detect a relative displacement between an input shaft and an output shaft by corresponding the relative displacement to a change in impedance. Magnetization signal generating units supply exciting currents with different magnetization frequencies to the first coil pair and a second coil pair, respectively. The magnetization frequency difference is set to 3.5 kHz or higher. Moreover, low-pass filters for intercepting passage of a frequency equivalent to the magnetization frequency difference are deployed in signal processing circuits respectively.

24 Claims, 21 Drawing Sheets

(51) Int. Cl.
*G01L 25/00* (2006.01)
*G01L 3/10* (2006.01)

(56) References Cited

U.S. PATENT DOCUMENTS

| | | | |
|---|---|---|---|
| 5,442,966 A * | 8/1995 | Hase | G01L 3/105 73/862.333 |
| 5,557,437 A | 9/1996 | Sakai et al. | |
| 5,641,916 A * | 6/1997 | Satoh | B62D 6/10 73/862.325 |
| 5,765,661 A | 6/1998 | Matsuoka | |
| 6,386,052 B1 | 5/2002 | Satoh et al. | |
| 6,456,090 B1 * | 9/2002 | Ishikawa | G01L 5/221 324/526 |
| 6,658,333 B2 | 12/2003 | Kawada et al. | |
| 6,807,871 B1 | 10/2004 | Paek | |
| 7,049,773 B2 | 5/2006 | Miyazawa et al. | |
| 7,389,851 B2 | 6/2008 | Miyaura | |
| 7,474,070 B2 | 1/2009 | Miyazawa et al. | |
| 8,001,851 B2 * | 8/2011 | Abe | G01D 5/2053 73/862.333 |
| 2005/0039548 A1 * | 2/2005 | Islam | G01L 3/109 73/862.334 |
| 2007/0205734 A1 * | 9/2007 | Miyazawa | B62D 5/049 318/432 |
| 2008/0053250 A1 * | 3/2008 | Yoneda | G01L 3/102 73/862.333 |
| 2008/0295613 A1 | 12/2008 | Shimizu | |
| 2008/0314163 A1 * | 12/2008 | Harata | G01L 3/102 73/862.333 |
| 2009/0218162 A1 * | 9/2009 | Miyoshi | G01L 3/105 180/443 |
| 2010/0077870 A1 * | 4/2010 | Sakai | G01L 3/105 73/862.334 |
| 2010/0101336 A1 * | 4/2010 | Yamakawa | G01L 3/105 73/862.333 |
| 2010/0254642 A1 * | 10/2010 | Watanabe | G01B 7/30 384/448 |
| 2012/0271513 A1 * | 10/2012 | Yoneda | B62D 5/0493 701/41 |
| 2013/0335154 A1 * | 12/2013 | Marmet | G04F 5/145 331/94.1 |
| 2014/0102219 A1 * | 4/2014 | Kuwahara | B62D 5/049 73/862.333 |

FOREIGN PATENT DOCUMENTS

| | | |
|---|---|---|
| CN | 1688874 A | 10/2005 |
| CN | 1906473 A | 1/2007 |
| DE | 100 47 949 A1 | 5/2001 |
| EP | 1 826 097 A1 | 8/2007 |
| EP | 1 998 157 A2 | 12/2008 |
| JP | 5-34220 A | 2/1993 |
| JP | 8-97774 A | 4/1996 |
| JP | 10-208177 A | 8/1998 |
| JP | 2000-121305 A | 4/2000 |
| JP | 2002-48656 A | 2/2002 |
| JP | 2002-148128 A | 5/2002 |
| JP | 2006-11576 A | 1/2006 |
| JP | 2006-267045 A | 10/2006 |
| JP | 2007-225388 A | 9/2007 |
| JP | 2009-73446 A | 4/2009 |
| JP | 4357373 B2 | 11/2009 |
| JP | 2010-190674 A | 9/2010 |
| JP | 2010190674 A * | 9/2010 |

OTHER PUBLICATIONS

Japanese Office Action dated Jul. 23, 2013 (four (4) pages).
English translation of Document C1 (Japanese-language Written Opinion (PCT/ISA/237)) previously filed on Aug. 30, 2012 (eight (8) pages).
English translation of International Preliminary Report on Patentability (PCT/IB/373) including Written Opinion (PCT/ISA/237) dated Dec. 23, 2013 of copending PCT International Application No. PCT/JP2012/001927 (U.S. Appl. No. 13/580,883) eight (8) pages).
Chinese Office Action dated Jan. 13, 2014 with English translation (fourteen (14) pages).
Chinese Office Action dated Dec. 20, 2013 with English translation (fifteen (15) pages).
Extended European Search Report dated Jun. 5, 2014 (six (6) pages).
Extended European Search Report dated Jan. 7, 2015 (four (4) pages).
English translation of document C1 (International Search Report (PCT/ISA/210)) previously filed on Aug. 30, 2012 (two (2) pages).

* cited by examiner

FREQUENCY DIFFERENCE : 2 kHz

FREQUENCY DIFFERENCE: 3 kHz OR HIGHER

NORMAL SIGNAL

ABNORMAL SIGNAL

FIG. 15A
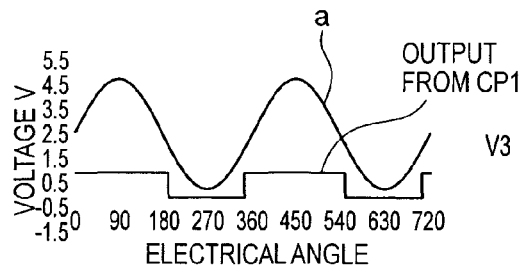
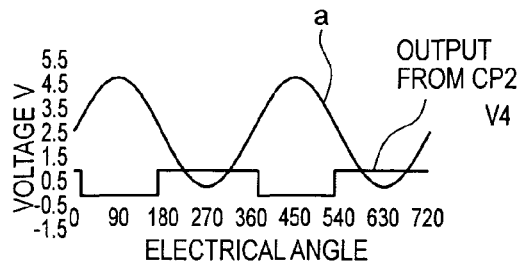
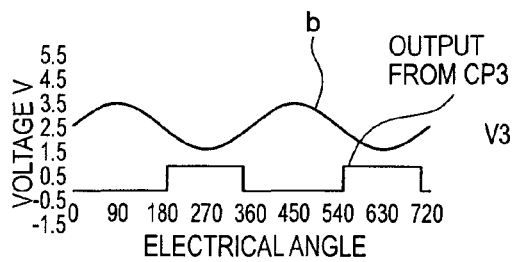
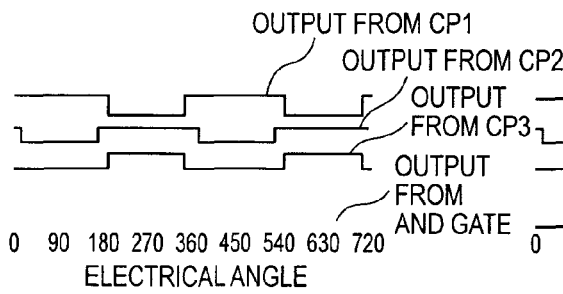
NORMAL STATE
(PHASE DIFFERENCE: 0 DEGREES)
FIG. 15B
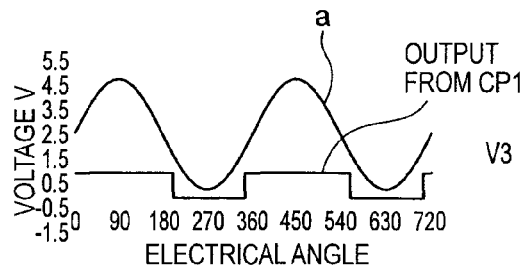
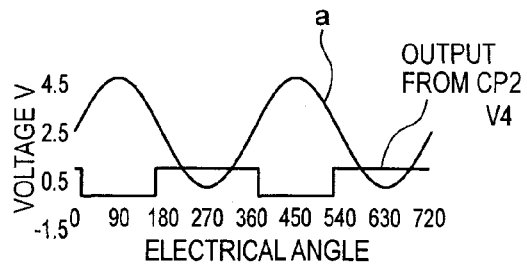
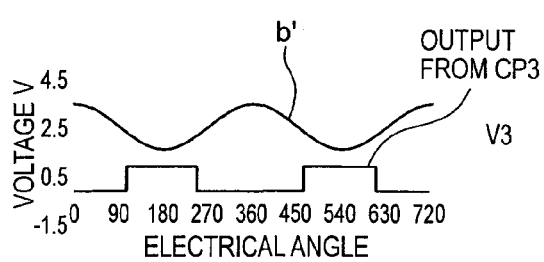
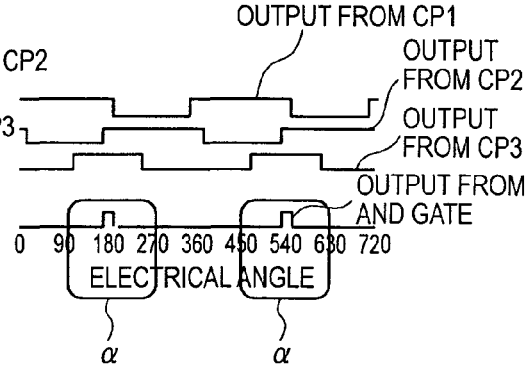
ABNORMAL STATE
(PHASE DIFFERENCE: 90 DEGREES)

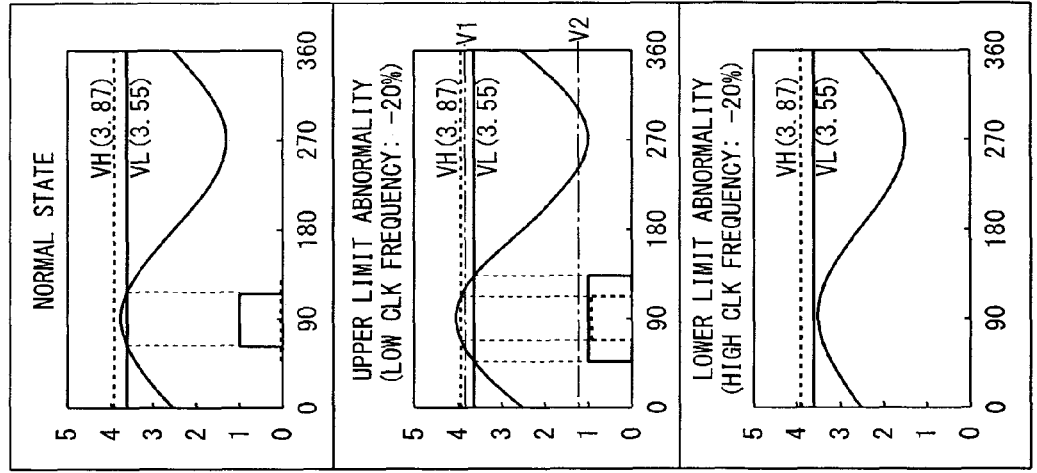
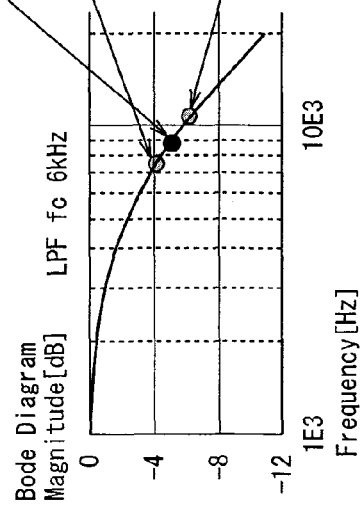

OFFSET VALUE

GRADIENT VALUE

NORMAL STATE

DURING INITIAL
DIAGNOSIS

WHEN FAILURE IS
DETECTED

NORMAL STATE

DURING INITIAL
DIAGNOSIS

WHEN FAILURE IS
DETECTED

TORQUE DETECTING DEVICE AND ELECTRIC POWER STEERING DEVICE

TECHNICAL FIELD

The present invention relates to a torque detecting device for detecting a torque exerted on a revolving shaft, and an electric power steering device.

BACKGROUND ART

An electric power steering device generally determines an assist force based on a steering torque detected by a torque sensor to drive and control an electric motor. An abnormality of this torque sensor greatly influences steering auxiliary control. Therefore, it is desirable to establish a duplex torque sensor system such that even if an abnormality occurs on one system of the system, the same function of the system may be continued by switching to the other system.

However, the region in which detection of a torque is carried out mainly around a torsion bar, but it lacks space. Therefore, in order to build the duplex system, two systems have to be arranged at almost coaxially adjacent positions.

Meanwhile, as a conventional torque sensor, coil type torque sensors are widely used, which reflects the torque exerted on a revolving shaft in impedance change of the coil, for detecting the impedance change. However, when such two systems of coil type torque sensors are arranged in almost coaxially adjacent positions, as described above, magnetic coupling may generate mutual interfering between the two systems. As a result, a low-precise torque signal will be generated during regular use thereof.

There is a technology disclosed in Patent Document 1, as an example for reducing the influence of generated magnetic flux interference by use of two or more coil pairs to. According to this technology, mutually different magnetization frequencies of exciting current supplied to two sets of coil pairs, respectively, and a low-pass filter for blocking passage of frequencies corresponding to the difference between the magnetization frequencies is used to reduce an AM modulated noise oscillating at a beat (beat tone) frequency developed due to the magnetization frequency difference.

PRIOR ART DOCUMENT

Patent Document

Patent Document 1: JP 2010-190674 A

SUMMARY OF INVENTION

Problem to be Solved

However, according to the technology disclosed in the aforementioned Patent Document 1, if the magnetization frequency difference is not set up appropriately, interference between coils becomes larger, and thus a stable torque value cannot be acquired effectively. Therefore, it may be difficult for the electric power steering device to perform stable steering auxiliary control.

Therefore, the present invention has an object to provide a torque detecting device capable of obtaining a stable torque signal with high accuracy, and an electric power steering device using the torque detecting device.

SUMMARY OF THE INVENTION

In order to solve the above problem, according to a first aspect of the present invention, there is provide a torque detecting device comprising: at least two sets of coil pairs for detecting a relative displacement between a first rotary shaft and a second rotary shaft, which are connected to each other via a torsion bar that generates a twist due to an input torque, by corresponding the relative displacement to a change in impedance; a plurality of oscillators, independently provided for each of the coil pairs, each for supplying a magnetization signal with a different magnetization frequency to each of the coil pairs, and a signal processing unit, independently provided for each of the coil pairs, each having a torque detection function for processing an output signal from each of the coil pairs and outputting a torque detection signal, wherein a magnetization frequency difference, which is a difference between the magnetization frequencies, is set to 3.5 kHz or higher.

In addition, according to a second aspect of the present invention, in the above torque detecting device, the magnetization frequency difference may be set to a value greater than a maximum value within a frequency band of the torque signal detected, and the signal processing unit may intercept passage of a frequency corresponding to the magnetization frequency difference, and comprises a low-pass filter for allowing the passage of a frequency corresponding to the maximum value.

Furthermore, according to a third aspect of the present invention, the above torque detecting device may further comprising: a monitoring unit for monitoring an abnormality of the torque detection function regularly; and an initial diagnostic unit for inputting a diagnosis signal to the monitoring unit and determining that the monitoring unit is operating normally before the torque detection function starts its operation.

Moreover, according to a fourth aspect of the present invention, in the above torque detecting device, the initial diagnostic unit may input to the monitoring unit a normal signal and an abnormal signal alternately, as diagnosis signals, and may determine that the monitoring unit is operating normally when the monitoring unit carries out a normality diagnosis in response to an input of the normal signal, and the monitoring unit carries out an abnormality diagnosis in response to the input of the abnormal signal.

Additionally, according to a fifth aspect of the present invention, in the above torque detecting device, the initial diagnostic unit may input to the monitoring unit, the normal signal, the abnormal signal, and the normal signal in this order as diagnosis signals.

In addition, according to a sixth aspect of the present invention, in the above torque detecting device, the monitoring unit may be a magnetization signal monitoring unit for monitoring a waveform of the magnetization signal; and the initial diagnostic unit may input a normal signal with an ideal waveform of the magnetization signal, and an abnormal signal different in frequency from the normal signal as diagnosis signals for the magnetization signal monitoring unit instead of the magnetization signal to be monitored.

Furthermore, according to a seventh aspect of the present invention, in the above torque detecting device, the initial diagnostic unit may input as the abnormal signal, a signal with a half the frequency of the normal signal.

Moreover, according to an eighth aspect of the present invention, in the above torque detecting device, the monitoring unit may be a phase monitoring unit for monitoring whether or not the torque detection signal has a phase shifted relative to the magnetization signal; and the initial diagnostic unit may input as the diagnosis signals for the phase monitoring unit, the magnetization signal and a signal having a phase of the magnetization signal is shifted via a phase shift circuit, instead of the torque detection signal to be monitored.

Additionally, according to a ninth aspect of the present invention, in the above torque detecting device, the signal processing unit may be configured to A/D convert the torque detection signal to be output, the monitoring unit may be an ADC monitoring unit for monitoring an output value from an A/D converted voltage value to be monitored, and the initial diagnostic unit my input as diagnosis signals for the ADC monitoring unit, a plurality of normal voltage values including a central voltage value within a regularly used voltage region of the torque detection signal and a plurality of abnormal voltage values different from the normal voltage value, instead of the voltage value to be monitored.

Further, according to a tenth aspect of the present invention, in the above torque detecting device, each of the oscillators may include a counter for dividing a frequency of a clock signal to generate a pulse with the magnetization frequency, and the monitoring unit may comprise a CR oscillator and a pulse width memory unit for calculating a width of an output pulse of the CR oscillator using the clock signal, and is a clock monitoring unit for monitoring the abnormality of the clock signal by calculating the width of the output pulse of the CR oscillator using the clock signal and comparing the calculated value to the width of the output pulse stored in the pulse width memory unit.

In addition, according to an eleventh aspect of the present invention, in the above torque detecting device, the initial diagnostic unit may determine that the clock monitoring unit is operating normally, when the clock monitoring unit inputs as the diagnosis signals for the clock monitoring unit, the pulse of the magnetization frequency generated by the counter instead of the clock signal to be monitored, counts width of the output pulse from the CR oscillator using the pulse of the magnetization frequency generated by the counter, and compares the resulting counted value to width of an output pulse stored in the pulse width memory unit, and diagnoses the abnormality.

Furthermore, according to a twelfth aspect of the present invention, in the above torque detecting device, the oscillators each may generate the magnetization signal with a sinusoidal waveform for the coil pair, based on the clock pulse, and the monitoring unit may comprise a low-pass filter for monitoring, which inputs the magnetization signal output from the oscillation unit, and is a clock frequency change monitoring unit for detecting a change in amplitude of an output from the low-pass filter as the change in the frequency of the clock pulse.

Moreover, according to a thirteenth aspect of the present invention, in the above torque detecting device, the clock frequency change monitoring unit may have a configuration for detecting whether or not at least either a peak value along an upper half wave or a lower half wave of the output from the low-pass filter for monitoring falls within a normal amplitude range.

Additionally, according to a fourteenth aspect of the present invention, in the above torque detecting device, the initial diagnostic unit may comprise a clock frequency selecting unit for selecting and supplying a regular clock signal and an abnormal clock signal different in magnetization frequency from the regular clock signal to the magnetization signal generating unit, and diagnoses the clock frequency change monitoring unit based on the detected and output result from the clock frequency change monitoring unit, when the regular clock signal and the abnormal clock signal are supplied as the diagnosis signals for the clock frequency selecting unit to the magnetization signal generating unit.

Further, according to a fifteenth aspect of the present invention, in the above torque detecting device, the abnormal clock signal may include two kinds of signals: an abnormal high frequency clock signal with a frequency higher than a highest permissible frequency of the regular clock signal; and an abnormal low frequency clock signal with the frequency lower than a lowest permissible frequency for the regular clock signal.

In addition, according to a sixteenth aspect of the present invention, in the above torque detecting device, the signal processing unit may further comprise: an AD converter for converting an analog signal corresponding to the torque to a digital signal; a memory unit for storing beforehand a gain correcting value and an offset correcting value for correcting a gain and an offset for the digital signal converted by the AD converter; and a first correction and calculation unit for correcting the digital signal converted by the AD converter based on the gain correcting value and the offset correcting value stored in the memory unit, and outputting the corrected value as the torque detection signal.

Furthermore, according to a seventeenth aspect of the present invention, in the above torque detecting device, the signal processing unit may further comprise: an AD converter for converting an analog signal corresponding to the torque to a digital signal; a memory unit for storing beforehand a gain correcting value and an offset correcting value for correcting a gain and an offset for the digital signal converted by the AD converter; a first correction and calculation unit for correcting the digital signal converted by the AD converter based on the gain correcting value and the offset correcting value stored in the memory unit, and outputting the corrected value as the torque detection signal; and a second correction and calculation unit for performing the same correcting operation as that of the first correction and calculation unit, wherein the monitoring unit is an operating logic monitoring unit for inputting the same signal to the first and second correction and calculation units, and comparing both calculated results to monitor whether or not the operating logic of the first correction and calculation unit is functioning normally.

Additionally, according to an eighteenth aspect of the present invention, in the above torque detecting device, the initial diagnostic unit may determine that the calculation logic monitoring unit is functioning normally by inputting to the second correction and calculation unit a signal different from the signal input to the first correction and calculation unit as a diagnosis signal, and determining that the calculated results differ.

Further, according to a nineteenth aspect of the present invention, in the above torque detecting device, the initial diagnostic unit may use an inverted signal of the input signal to the first correction and calculation unit as a different signal to be input to the second correction and calculation unit from that to be input to the first correction and calculation unit.

In addition, according to a twentieth aspect of the present invention, in the above torque detecting device, the signal processing unit may be provided to correspond to two sets of coil pairs, is configured to output a main torque signal based on each of the output signals from the two sets of coil pairs, respectively, and may comprise a diagnostic information output unit for outputting diagnostic information including the abnormality diagnosis result from the monitoring unit.

Furthermore, according to a twenty-first aspect of the present invention, in the above torque detecting device, the signal processing unit may be configured to calculate a main torque signal and the sub torque signal based on output signals from the coil pairs and to output only the main torque signal, and the monitoring unit may be a torque signal monitoring unit for monitoring an abnormality of the signal processing unit by comparing the main torque signal to the sub torque signal.

Moreover, according to a twenty-second aspect of the present invention, in the above torque detecting device, the diagnostic information output unit may output as the diagnostic information at least three kinds of information including: information that the abnormality diagnosis result from the monitoring unit is normal; information that the abnormality diagnosis result from the monitoring unit is abnormal; and information that the initial diagnostic unit is conducting an initial diagnosis.

Additionally, according to a twenty-third aspect of the present invention, in the above torque detecting device, the diagnostic information output unit may output as the diagnostic information, a pulse signal with a fixed period when the abnormality diagnosis result from the monitoring unit is normal, a high level signal when the abnormality diagnosis result from the monitoring unit is abnormal, and a low level signal when the initial diagnostic unit is conducting initial diagnosis.

According to the first aspect of the present invention, there is provided a power steering device including: the torque detecting device of any one of the first to the twenty-second aspects of the present invention for detecting a steering torque input to a steering mechanism; and a motor control unit for drive-controlling an electric motor to supply to a steering system a steering auxiliary power that reduces a driver's steering burden, based on at least a steering torque detected by the torque detecting device.

Advantageous Effects of the Invention

Since a torque detecting device according to the present invention is provided with two or more coil pairs, oscillation units, and signal processing systems, and the magnetization frequency difference is set to 3.5 kHz or higher, it is possible to attenuate a component superimposed on a torque signal due to magnetic flux interference generated from each coil effectively. Therefore, a highly precise, stable torque signal may be obtainable.

Accordingly, an electric power steering device provided with the aforementioned torque detecting device is capable of performing stable steering auxiliary control.

BRIEF DESCRIPTION OF THE DRAWINGS

FIG. 15A and FIG. 15B are graphs illustrative of an example of a signal waveform for initial diagnosis of the phase monitoring unit;
FIG. 20A to FIG. 20D are graphs for explaining output from a low-pass filter.

DESCRIPTION OF EMBODIMENTS

Embodiments of the present invention will be described below with reference to the drawings.

First Embodiment

Figure 1:
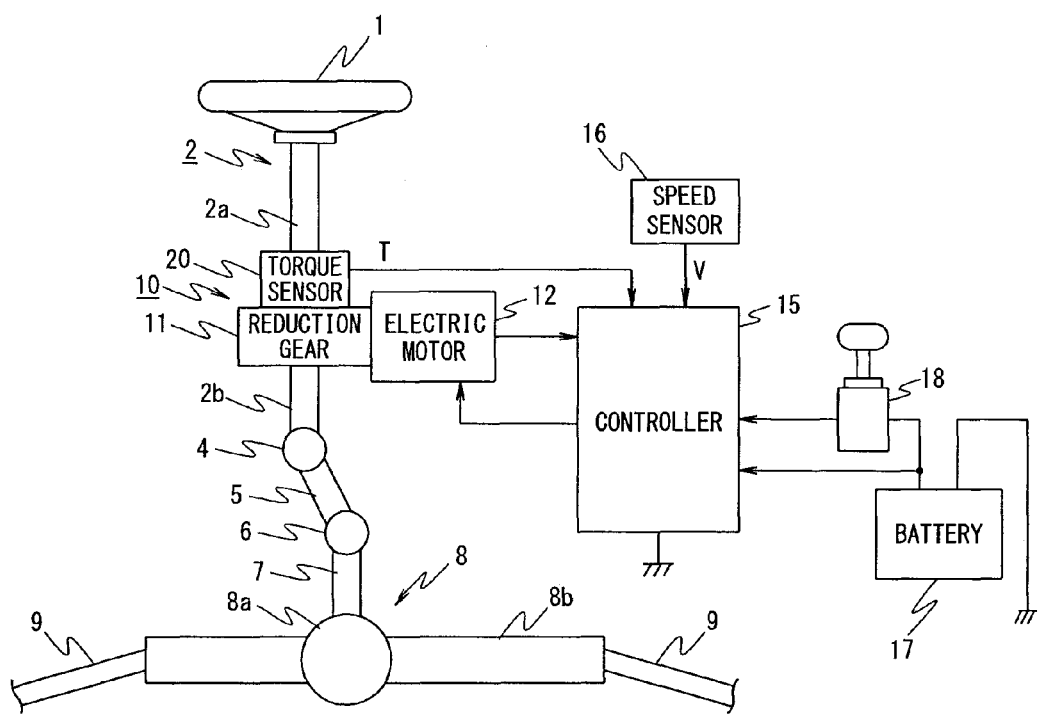
FIG. 1 is an overall schematic diagram illustrative of an electric power steering device according to an embodiment.

FIG. 1 is an overall schematic diagram illustrative of an electric power steering device according to the present embodiment.

Reference numeral 1 in FIG. 1 denotes a steering wheel. A steering force given to this steering wheel 1 by a driver is transmitted to a steering shaft 2 including an input shaft 2a and an output shaft 2b. One end of the input shaft 2a of the steering shaft 2 is connected to the steering wheel 1, and the other end is connected to one end of the output shaft 2b via a torque sensor 20 of a torque detecting device 30, described later.

The steering force transmitted to the output shaft 2b is then transmitted to a middle shaft 5 via a universal joint 4, and then transmitted to a pinion shaft 7 via a universal joint 6. The steering force transmitted to this pinion shaft 7 is then transmitted to a tie rod 9 via a steering gear 8, thereby turning steering wheels, not illustrated. The steering gear 8 is configured in a rack and pinion form by a pinion 8a connected to the pinion shaft 7 and a rack 8b engaged with the pinion 8a. The rack 8b transforms the rotational movement transmitted to the pinion 8a to a translatory movement.

A steering auxiliary mechanism 10, which transmits the steering auxiliary force to the output shaft 2b, is connected to the output shaft 2b of the steering shaft 2. The steering auxiliary mechanism 10 is provided with a reduction gear 11 connected to the output shaft 2b, and an electric motor 12, which is connected to the reduction gear 11 and generates a steering auxiliary force for a steering system.

The torque sensor 20 is provided for detecting the steering torque applied to the steering wheel 1 and then transmitted to the input shaft 2a. The torque sensor 20 detects a relative displacement (rotational displacement) between the input shaft 2a and the output shaft 2b, which are connected by a torsion bar, not illustrated, to correspond to the impedance change of a coil pair. A torque detected value T output from the torque sensor 20 is input to a controller 15.

The controller 15 operates based on power supplied from an in-vehicle battery 17 (e.g., its rated voltage is 12V). The negative electrode of the battery 17 is grounded, the positive electrode is connected to the controller 15 via an ignition switch 18, which starts an engine, and is also connected to the controller 15 directly not via the ignition switch 18.

A speed detected value V detected by a speed sensor 16 as well as the torque detected value T are input to the controller 15, thereby carrying out steering auxiliary control, which gives to the steering system steering auxiliary power according to the input. More specifically, a steering auxiliary torque instruction value used for an electric motor 12 to generate the above-mentioned steering auxiliary power is calculated in well-known processing steps, thereby carrying out feedback control of a drive electric current supplied to the electric motor 12 based on the calculated steering auxiliary torque instruction value and the motor current detected value.

Next, a configuration of the torque detecting device 30 will be explained in detail.

Figure 2:
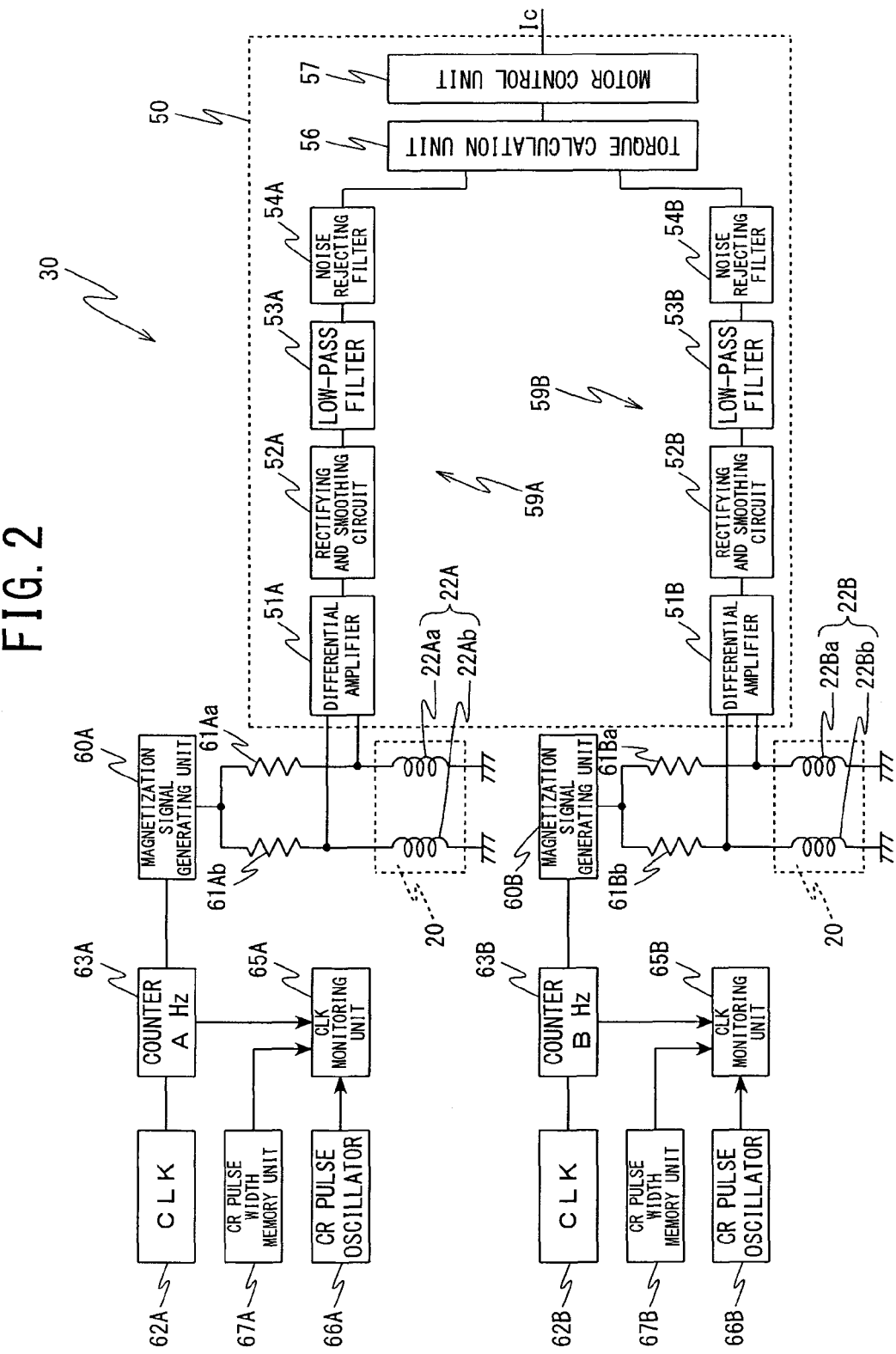
FIG. 2 is a block diagram of a configuration of a torque detecting device of a first embodiment.
Figure 3:
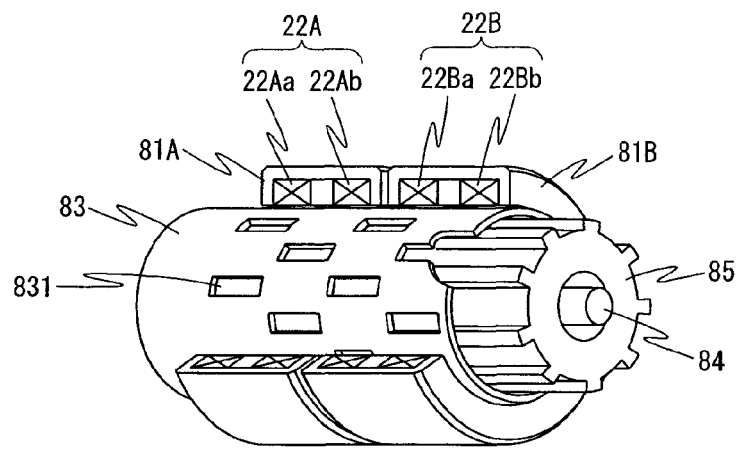
FIG. 3 illustrates a peripheral configuration of a coil constituting a torque sensor.

FIG. 2 is a block diagram of a configuration of the torque detecting device 30. The torque detecting device 30 is provided with the torque sensor 20 mentioned above. This torque sensor 20 is provided with two sets of coil pairs 22A and 22B. The torque sensor 20, as illustrated in FIG. 3 illustrative of a peripheral configuration of the coil, includes a first yoke 81A, a second yoke 81B, a cylinder member 83, multiple windows 831, which are arranged on the outer peripheral region of the cylinder member 83, facing the coil pair 22Aa and 22Ab, a torsion bar 84, and a sensor shaft 85. Note that the torsion bar 84, the sensor shaft 85, and the input shaft 2a and the output shaft 2b of the steering shaft 2 are arranged coaxially.

The coil pair (first coil pair) 22A is constituted by coils 22Aa and 22Ab which have the same standard, and is arranged in the cylindrical first yoke 81A, as illustrated in FIG. 3. Similarly, the coil pair (second coil pair) 22B is constituted by coils 22Ba and 22Bb which have the same standard, and is arranged in the cylindrical second yoke 81B, as illustrated in FIG. 3.

The torque detecting device 30 is arranged for the first and the second coil pair 22A and 22B, respectively, and has signal processing circuits (signal processing units) 59A and 59B for processing the output signals from the respective coil pairs. The signal processing circuits 59A and 59B are arranged in the controller 15.

The magnetization signal generating unit 60A is connected to the first coil pair 22A, and supplies magnetization current to the coils 22Aa and 22Ab constituting the first coil pair 22A. Moreover, the magnetization signal generating unit 60B is connected to the first coil pair 22B, and supplies a magnetization current to the coils 22Ba and 22Bb constituting the first coil pair 22B. As such, the magnetization currents are supplied from respective, different magnetization signal generating units to the first and the second coil pair 22A and 22B.

The magnetization signal generating units 60A and 60B generate alternating currents with predetermined different excitation frequencies, respectively. Herein, the magnetization signal generating unit 60A generates an excitation frequency of A [Hz] (first excitation frequency f1), and the magnetization signal generating unit 60B generates an excitation frequency of B [Hz] (second excitation frequency f2). Note that the excitation frequencies of the magnetization signals are generated using a technique of counting the clock frequency and the frequency of the clock signal is divided to be converted to those excitation frequencies.

That is, the torque detecting device 30 is provided with CLKs 62A and 62B for outputting clock signals, and counters 63A and 63B for counting the clock frequencies. Herein, a commercially available clock, such as a quartz oscillator, is used as the CLK 62A and 62B. Since such a commercially available clock includes a frequency error of approximately 2%, which is high accuracy, a high stabilization of the sensor system's performance is obtainable.

Note that these magnetization signal generating units 60A and 60B, the CLKs 62A and 62B, and the counters 63A and 63B constitute oscillating circuits, respectively.

One ends of the coils 22Aa and 22Ab constituting the first coil pair 22A are connected to the magnetization signal generating unit 60A via electric resistors 61Aa and 61Ab, respectively. Moreover, the other ends of the Coils 22Aa and 22Ab constituting the first coil pair 22A are grounded. Similarly, one ends of the coils 22Ba and 22Bb constituting the second coil pair 22B are connected to the magnetization signal generating unit 60B via electric resistors 61Ba and 61Bb, respectively. Moreover, the other ends of the Coils 22Ba and 22Bb constituting the second coil pair 22B are grounded.

The output signal from the first coil pair 22A is a terminal voltage between the coils 22Aa and 22Ab constituting the first coil pair 22A, and the output signal from the second coil pair 22B is a terminal voltage between the coils 22Ba and 22Bb constituting the second coil pair 22B. These output signals are output to the signal processing circuits 59A and 59B, respectively.

The signal processing circuit 59A includes a differential amplifier 51A, a rectification and smoothing circuit 52A, a low-pass filter 53A, and a noise rejecting filter 54A. On the other hand, the signal processing circuit 59B includes a differential amplifier 51B, a rectification and smoothing circuit 52B, a low-pass filter 53B, and a noise rejecting filter 54B. Note that the low-pass filters 53A and 53B may be included in the rectification and smoothing circuits 52A and 52B, respectively.

The differential amplifier 51A amplifies output a difference between the outputs from the coils 22Aa and 22Ab constituting the first coil pair 22A, that is, a difference between the terminal voltages (terminal voltage difference) of the coil 22Aa and 22Ab, and outputs the resulting signal. The rectification and smoothing circuit 52A rectifies, smoothes, and outputs the output from the differential amplifier 51A. The output from the rectification and smoothing circuit 52A passes through the low-pass filter 53A and the noise rejecting filter 54A, thereby removing noise. The resulting signal is then input to the torque calculation unit 56.

Herein, the cutoff frequency of the low-pass filter 53A is set to a value smaller than the difference in the magnetization frequency (magnetization frequency difference) of the exciting current supplied to each coil pair. Consequently, the passage of a frequency corresponding to the magnetization frequency difference is intercepted. Furthermore, the cutoff frequency of the low-pass filter 53A is set to a value greater than the maximum value within a frequency band (torque signal band) of the torque signal detected by the torque sensor 20. Therefore, a signal within the torque signal band passes through the low-pass filter 53A.

Note that since the signal processing circuit 59B has the same configuration as that of the signal processing circuit 59A, the description thereof will be omitted herein.

Figure 4:
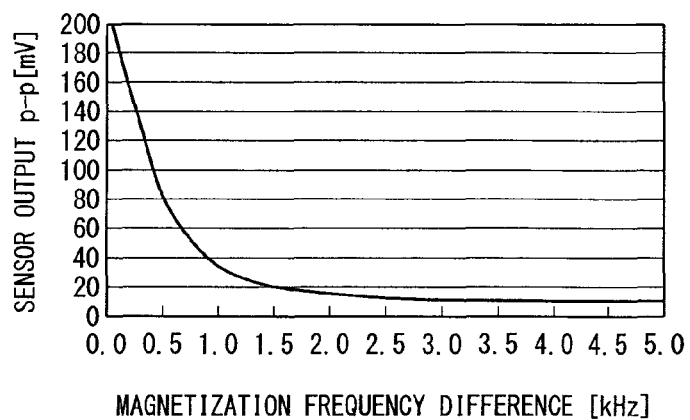
FIG. 4 is a graph illustrative of a relationship between magnetization frequency difference and magnetic interference.
Figure 5A:
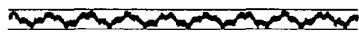
FIG. 5A and FIG. 5B are graphs illustrative of a difference between sensor output waveforms due to difference in magnetization frequency difference.
Figure 5B:

Meanwhile, when there is a difference between the first and the second magnetization frequency f1 and f2, the magnetic flux generated by the first coil pair 22A interferes with the magnetic flux generated by the second coil pair 22B. Consequently, ripple of a generated interference component is superimposed on the torque signal. This ripple has such a property that the greater the magnetization frequency difference (=|f1−f2|), the smaller it becomes. As illustrated in FIG. 4, the magnetization frequency difference declines at approximately 3.5 kHz. Therefore, when the magnetization frequency difference is 2 kHz, an interference component is superimposed on the torque signal, and the sensor output waveform thus fluctuates periodically as illustrated in FIG. 5A. On the contrary, when the magnetization frequency difference is equal to or higher than 3.5 kHz, the sensor output waveform will be almost lost, as illustrated in FIG. 5B.

Therefore, in the present embodiment, the magnetization frequency difference between the first magnetization frequency f1 and the second magnetization frequency f2 is set to 3.5 kHz or higher.

In the present embodiment, the torque signal band is approximately 80 Hz. Therefore, when a cutoff frequency of each of the low-pass filters 53A and 53B is set to 100 Hz, the passage of the frequencies of 3.5 kHz or higher will be intercepted reliably by the low-pass filters 53A and 53B.

In this manner, the magnetization frequency difference is set to 3.5 kHz or higher, which is ten times or more the maximum value within the torque signal band, and the cutoff frequency of each of the low-pass filters 53A and 53B is set to a value between the maximum value within the torque signal band the magnetization frequency difference. Accordingly, the superimposed component of the torque signal due to the magnetic interference will be reduced effectively, thereby improving the accuracy of the torque signal.

Moreover, since the magnetization signal is generated using a commercially available, highly accurate clock, such as a quartz oscillator, the magnetization frequency can be stabilized. When the first and second magnetization frequencies f1 and f2 fluctuate due to a certain defect, it is assumed that those frequencies will be closer to each other. At this time, when the magnetization frequency difference is less than the aforementioned 3.5 kHz, an interference component is gradually superimposed on the torque signal, and then the accuracy of the torque signal will deteriorate. On the other hand, according to the present embodiment, since the magnetization frequency can be stabilized, deterioration of the accuracy of the torque signal can be prevented.

Returning to FIG. 2, the torque calculation unit 56 performs a predetermined calculation for a steering torque generated in the steering system based on the output (e.g., average value) from the noise rejecting filter 54A or 54B. The motor control unit 57 supplies the electric motor 12 with a drive current for generating the steering auxiliary torque for reducing the steering torque given by a driver, based on the calculated result from the torque calculation unit 56.

The torque detecting device 30 has a redundant configuration including a first torque detection system, which includes the first coil pair 22A and the signal processing circuit 59A, and a second torque detection system, which includes the second coil pair 22B and the signal processing circuit 59B. The electric power steering device illustrated in FIG. 1 usually controls the electric motor 12, so as to conduct steering auxiliary control based on a steering torque detected by the first torque detection system and the second torque detection system. On the other hand, when a malfunction occurs in the first or the second torque detection system, switching to a malfunction-free system will be made to continue detection of the steering torque, and continue the steering auxiliary control.

Moreover, since an abnormality of the steering torque detecting function will adversely affect the steering auxiliary control seriously, the aforementioned abnormality detectors 64A and 64B regularly monitor whether there is an abnormality in frequency fluctuation of the clock signal while the controller 15 is conducting the steering auxiliary control. Herein, the clock monitoring units 65A and 65B are arranged monitoring whether the CLKs 62A and 62B for generating magnetization signals are operating normally.

The clock monitoring units 65A and 65B count, in synchronization with clock signals output from the CLKs 62A and 62B, respectively, the output pulses (CR oscillation pulses) output from CR oscillators 66A and 66B each using a capacitor (C) and a resistor (R), and compare the resulting counted values to initial values stored in CR pulse width memory units (pulse width memory units) 67A and 67B, respectively, to determine whether the clock frequencies are normal. The above-mentioned initial values are obtained by counting the output pulses including initial fluctuation output from the CR oscillators 66A and 66B, in synchronization with the clock signals output from the CLKs 62A and 62B beforehand at a production time, and stored in the CR pulse width memory units 67A and 67B, respectively.

Figure 6:
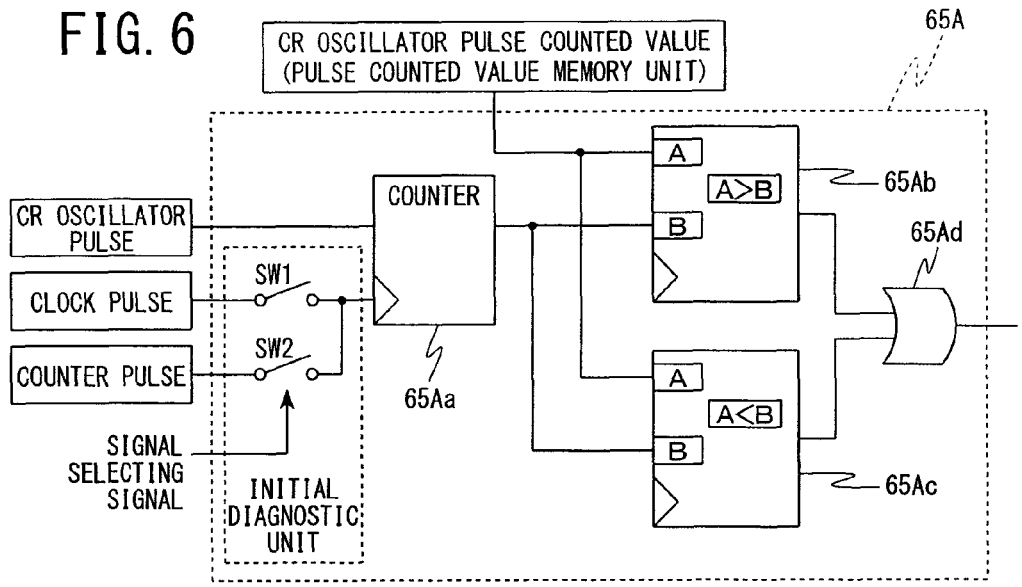
FIG. 6 is a block diagram of a configuration of a clock monitoring unit.

FIG. 6 is a block diagram of a configuration of the clock monitoring unit 65A. Note that since the configuration of the clock monitoring unit 65B is the same as the clock monitoring unit 65A, description thereof is omitted. The clock monitoring unit 65A includes a counter 65Aa, which counts CR oscillation pulses in synchronization with a clock, comparators 65Ab and 65Ac, which compare the pulse count counted by the counter 65Aa to pulse count for the CR oscillator 66A stored in the CR pulse width memory unit 67A, and an OR circuit 65Ad to which the outputs from the comparator 65Ab and 65Ac are input.

With such a configuration, the output signal from the OR circuit 65Ad becomes "0", which indicates that the clock frequency is normal, if the pulse count counted by the counter 65Aa is equal to the pulse count for the CR oscillator 66A stored in the CR pulse width memory unit 67A. Otherwise, if the pulse count counted by the counter 65Aa is not equal to the pulse count for the CR oscillator 66A stored in the CR pulse width memory unit 67A, the output signal becomes "1", which indicates a clock frequency abnormality.

In order to monitor the accuracy of the clock frequency, a technique of providing a clock for monitoring independently and monitoring correctness of the clock frequency based on the difference therebetween is generally used. However, in the case of using this technique, a sensor system using a highly accurate clock, such as the CLK 62A, requires a highly accurate clock as the clock for monitoring, so as to monitor the accuracy of the clock frequency. As a result, the cost will increase.

On the other hand, according to the present embodiment, even a combination with the inexpensive CR oscillator 66A allows monitoring of the clock frequency of the CLK 62A with high accuracy. This configuration will eliminate the necessity of an expensive, independent clock for monitoring, and thus the cost thereof will be reduced.

Moreover, commercially available, highly accurate resistors include an error of approximately 1%. However, commercially available, highly accurate capacitors include an error of approximately 5%. Therefore, in light of fluctuation of the CR oscillators due to those errors included, simple comparison of the output pulse from the CR oscillator to the clock signal cannot provide highly accurate monitoring of approximately 2% or less.

On the other hand, the present embodiment always counts the output pulses including fluctuation from the CR oscillator in synchronization with a clock, and compares them to a pre-counted value (initial value), which is counted beforehand at the time of manufacturing in the same way so as to monitor the clock frequency. Therefore, monitoring the accuracy will be improved up to a level expected in consideration of a change in temperature characteristics of the CR. That is, the monitoring the accuracy can be improved up to approximately 3%. Note that approximately 6%, which is twice that percentage, may be permissible in actuality.

Moreover, the clock monitoring unit 65A has an initial diagnostic function for diagnosing whether a clock frequency monitoring function is operating normally. The initial diagnosis is conducted immediately after the power is turned on (or ignition switch 18 is turned on), and before the controller 15 starts the steering auxiliary control. Note that a flag etc., which indicates that initial diagnosis is being conducted, is set at the time of the initial diagnosis, so as to prevent the controller 15 from using the torque sensor signal (i.e., prevent the steering auxiliary control).

The clock monitoring unit 65A includes switches SW1 and SW2 as an initial diagnostic unit on the previous stage of the clock input terminal of the counter 65Aa. These switches SW1 and SW2 are included so that either thereof is turned on in response to a signal selection command. The switch SW1 is turned on in the regular clock frequency monitoring mode (regular diagnostic mode), whereas the switch SW2 is turned on in the initial diagnostic mode.

That is, in the regular diagnostic mode, the clock pulses output from the CLKs 62A and 62B are input as clocks used by the counter 65Aa. In the initial diagnostic mode before the torque detecting function of the torque detecting device 30 starts operating (particularly before the oscillating circuit starts operating), the counter pulses output from the counter 63A are input instead of the clock pulses output from the CLKs 62A and 62B as a clock used by the counter 65Aa.

In this manner, an abnormal signal is used to calculate the pulse count of the CR oscillator 66A in the initial diagnostic mode. It is determined that the clock frequency monitoring function is operating normally, by determining that the output signal from the OR circuit 65Ad is "1" when the abnormal signal is input.

Moreover, in the initial diagnostic mode, the normal signal and the abnormal signal may be input as diagnosis signals alternately. The normal signal denotes an ideal clock pulse output from the CLK 62A and CLK 62B. The abnormal signal denotes a counter pulse output from the counter 63A. Furthermore, in the initial diagnostic mode, the normal signal may be input again after the normal and the abnormal signal are input.

In this case, by determining the output signal from the OR circuit 65Ad is "0" when the normal signal is input and that the output signal from the OR circuit 65Ad is "1" when the abnormal signal is input, it is determined that the clock frequency monitoring function is operating normally. In this manner, whether the initial diagnostic function is operating normally is determined. Moreover, whether the diagnosis signal is input normally is also determined.

As mentioned above, it is possible to achieve a more reliable redundant torque sensor system by providing and adding an inexpensive excitation frequency monitoring function.

Example 1

Next, advantageous effects of the first embodiment will be explained with an example.

Herein, the magnetization frequency difference between the first and the second magnetization frequencies f1 and f2 is set to 4.5 kHz or higher.

Change in magnetization frequency difference is investigated assuming that the first and second magnetization frequencies f1 and f2 fluctuate and become closer to each other by 6%, respectively. The result is given in Table 1.

Note that numerical unit in Table 1 is [kHz].

TABLE 1

| magnetization frequency difference | first magnetization frequency f1 | | Second magnetization frequency f2 | | magnetization frequency difference after fluctuation of |
|---|---|---|---|---|---|
| | Set | −6% | Set | −6% | +−6% |
| 2 | 8 | 7.52 | 6 | 6.36 | 1.16 |
| 3 | 9 | 8.46 | | | 2.10 |
| 4 | 10 | 9.40 | | | 3.04 |
| 5 | 11 | 10.34 | | | 3.98 |
| 6 | 12 | 11.28 | | | 4.92 |

In this Table 1, in cases where the first magnetization frequency f1 is set to 8 kHz, 9 kHz, 10 kHz, 11 kHz, and 12 kHz, and the second magnetization frequency f2 is set to 6 kHz, there is a change in magnetization frequency difference when the first magnetization frequency f1 changes by −6%, and the second magnetization frequency f2 changes by +6% (when magnetization frequency is fluctuated within the range of +−6%).

Referring to Table 1, the magnetization frequency difference decreases down to 3.04 kHz during a fluctuation of +−6% even when the magnetization frequency difference is set to 4 kHz (f1=10 kHz, and f2=6 kHz). Moreover, when the magnetization frequency difference is set to 5 kHz (f1=11 kHz, and f2=6 kHz), the magnetization frequency difference will be suppressed to 3.98 kHz during a fluctuation of +−6%. Furthermore, when the magnetization frequency difference is set to 6 kHz (f1=12 kHz, and f2=6 kHz), the magnetization frequency difference can be suppressed to 4.92 kHz during a fluctuation of +−6%.

Figure 7:
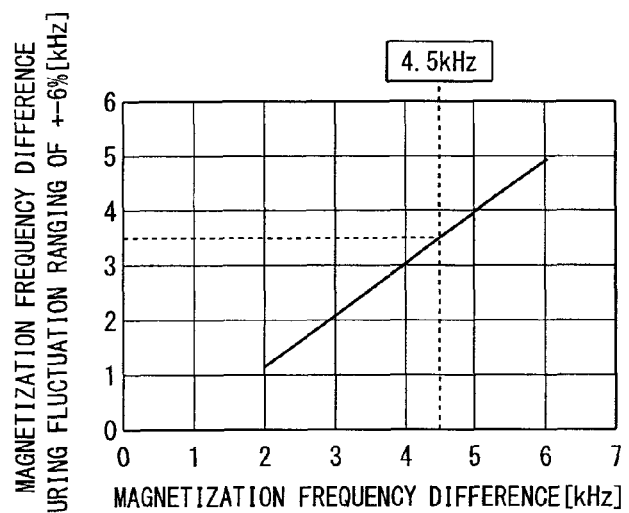
FIG. 7 is a graph illustrative of the magnetization frequency difference during fluctuation ranging of +−6%.

That is, FIG. 7 illustrates a relationship between the predetermined magnetization frequency difference and magnetization frequency difference during fluctuations of +−6%.

As mentioned above, in order to attenuate the superimposed component of the torque signal, it is necessary to stabilize the magnetization frequency difference at 3.5 kHz or higher. For this end, in order for the magnetization frequency difference not to drop below 3.5 kHz during fluctuations of +−6%, the magnetization frequency difference should be set to 4.5 kHz or higher beforehand, as is apparent from FIG. 7.

In this manner, the clock frequency fluctuation of up to 6% is permissible by setting the magnetization frequency difference to 4.5 kHz or higher. Accordingly, the superimposed component of the torque signal can be stably attenuated, thereby suppressing degradation of the accuracy of the torque signal.

Example 2

Next, advantageous effects of the first embodiment will be explained below using another example.

Herein, the magnetization frequency difference between the first and second magnetization frequencies f1 and f2 is set to 5.22 kHz or higher.

Change in the magnetization frequency difference is investigated assuming that the first and the second magnetization frequencies f1 and f2 fluctuate and become closer to each other by 10%. The result is given in Table 2. Note that numerical unit in Table 2 is [kHz].

TABLE 2

| magnetization frequency difference | first magnetization frequency f1 | | Second magnetization frequency f2 | | magnetization frequency difference after fluctuation of |
|---|---|---|---|---|---|
| | Set | −10% | Set | −10% | +−10% |
| 2 | 8 | 7.20 | 6 | 6.60 | 0.6 |
| 3 | 9 | 8.10 | | | 1.5 |
| 4 | 10 | 9.00 | | | 2.4 |
| 5 | 11 | 9.90 | | | 3.3 |
| 6 | 12 | 10.8 | | | 4.2 |

In Table 2, in cases where the first magnetization frequency f1 is set to 8 kHz, 9 kHz, 10 kHz, 11 kHz, and 12 kHz, and the second magnetization frequency f2 is set to 6 kHz, there is a change in magnetization frequency difference when the first magnetization frequency f1 changes by −10%, and the second magnetization frequency f2 changes by +10% (when magnetization frequency is fluctuated within the range of +−10%).

Referring to Table 2, the magnetization frequency difference decreases down to 2.4 kHz during a fluctuation of +−10% even when the magnetization frequency difference is set to 4 kHz (f1=10 kHz, and f2=6 kHz). Moreover, when the magnetization frequency difference is set to 5 kHz (f1=11 kHz, and f2=6 kHz), the magnetization frequency difference will be suppressed to 3.3 kHz during a fluctuation of +−10%. When the magnetization frequency difference is set to 6 kHz (f1=12 kHz, and f2=6 kHz), the magnetization frequency difference during a fluctuation of +−10% can be suppressed to 4.2 kHz.

Figure 8:
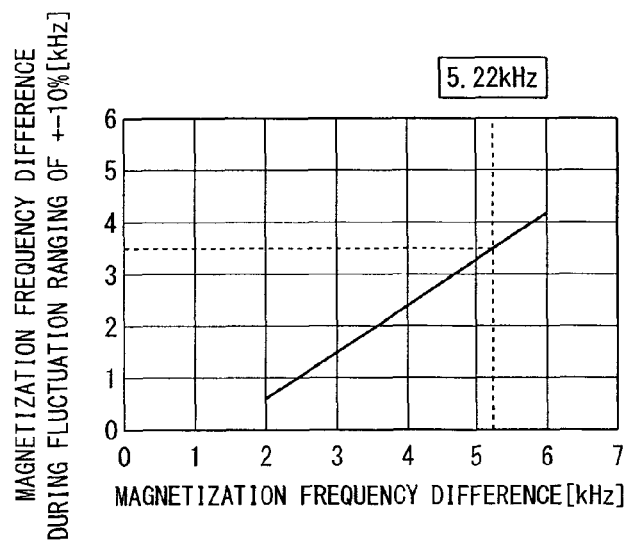
FIG. 8 is a graph illustrative of the magnetization frequency difference during fluctuation ranging from +−10%.

That is, FIG. 8 illustrates a relationship between the predetermined magnetization frequency difference and the magnetization frequency difference during fluctuations of +−10%.

As mentioned above, in order to attenuate the superimposed component of the torque signal, the magnetization frequency should be stabilized at 3.5 kHz or higher. Therefore, in order for the magnetization frequency difference not to drop below 3.5 kHz during fluctuations of +−10%, the magnetization frequency difference should be set to 5.22 kHz or higher beforehand, as apparent from FIG. 8.

In this manner, the clock frequency fluctuation of up to 10% is permissible by setting the magnetization frequency difference to 5.22 kHz or higher. That is, since a comparatively large variation is permissible, lower accuracy of the CR oscillators 66A and 66B is permissible. This can decrease the part unit cost. Accordingly, it is possible to stabilize and attenuate the superimposed component of the torque signal, and degradation in the accuracy of the torque signal can be suppressed.

Second Embodiment

Next, a second embodiment of the present invention will be explained.

The second embodiment differs from the first embodiment in the configuration of the torque detecting device 30.

Figure 9:
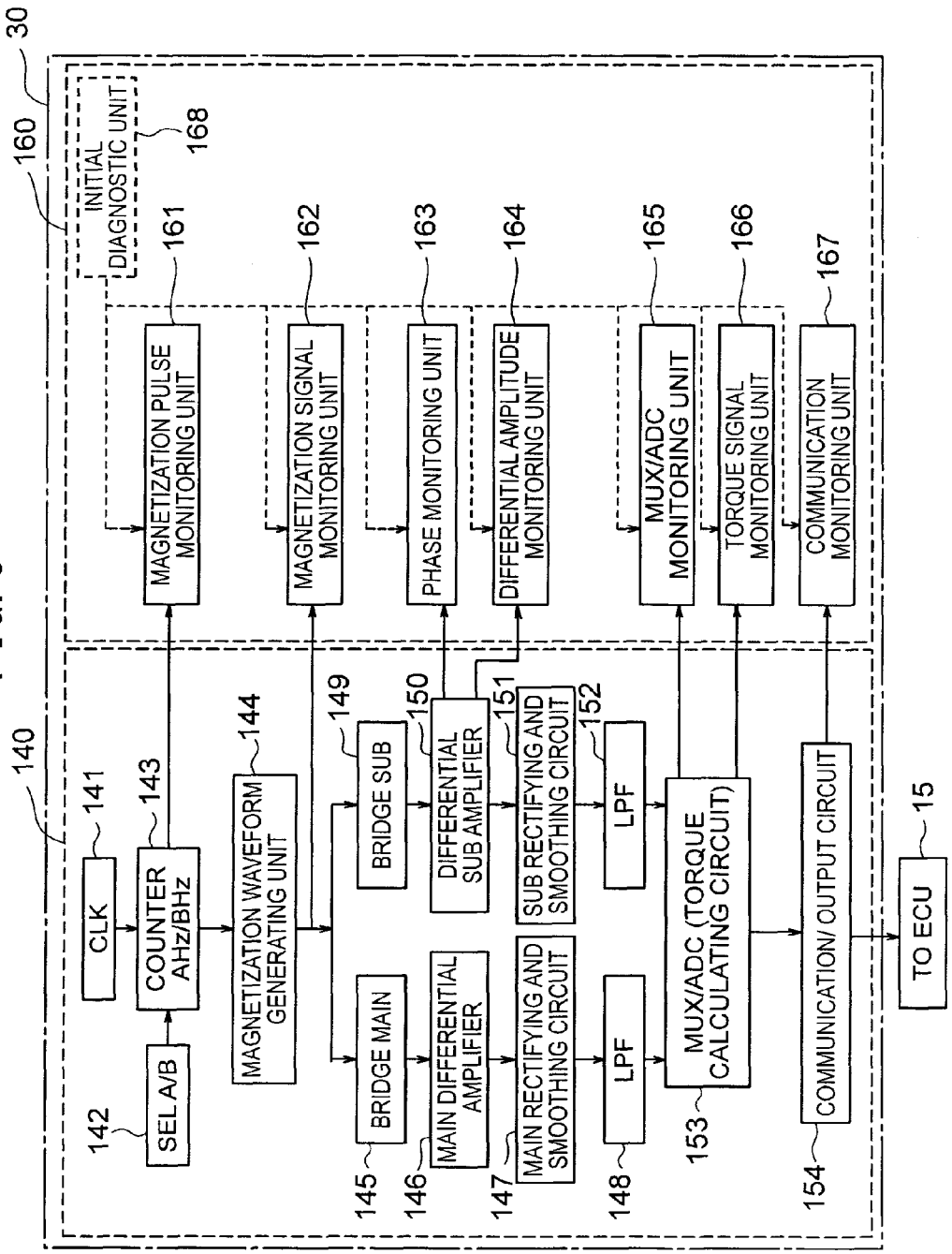
FIG. 9 is a block diagram of a configuration of a torque detecting device of a second embodiment.

FIG. 9 is a block diagram of a configuration of the torque detecting device 30. In FIG. 9, the torque detecting device 30 is provided with: a signal processing circuit (signal processing unit) 140 for processing the output signals from the coil pair when a magnetization signal is supplied to the coil pair constituting the torque sensor 3, and then outputting a torque detection signal; and a diagnostic device 160 provided with monitoring units, each monitoring abnormality of each block in the signal processing circuit 140. Herein, for simplification of the explanation, there are illustrated the signal processing circuit 140 and the diagnostic device 160 in only either one of the first and the second torque detection system.

The signal processing circuit 140 is mainly configured with a clock unit, a magnetization unit, a sensor unit, a signal processing unit, and a communication output unit.

The clock unit is provided with a CLK 141, which is constituted by a commercially available clock (e.g., a quartz oscillator). Moreover, the clock unit includes a counter 143 for frequency-dividing and converting a clock signal to a designated frequency (magnetization frequency) based on the clock signal output from the CLK 141 and the designated frequency (either A Hz or B Hz) selected by an SEL 142. A magnetization pulse output from the counter 143 is input to a magnetization waveform generating unit 144, which constitutes a magnetization unit.

The magnetization waveform generating unit 144 generates a magnetization signal with a selected frequency of either A Hz or B Hz based on the magnetization pulse input from the counter 143, and then outputs it to a sensor unit. In this situation, the generated magnetization signal is supplied to a main bridge circuit (bridge MAIN) 145 and a sub bridge circuit (bridge SUB) 149, which constitute a sensor unit.

The main bridge circuit 145 is provided with a coil pair including a first coil and a second coil. When a magnetization signal is supplied to the coil pair, a main differential amplifier 146 amplifies and outputs a difference (terminal voltage difference) between the terminal voltages of the first coil and the second coil. Such an output signal is input to a main rectification smoothing circuit 147 for rectifying and smoothing the signal, and is then output therefrom. A low-pass filter (LPF) 148 removes noise from the smoothed output signal, and outputs the resulting signal to a torque calculating circuit 153, which constitutes a signal processing unit. Note that explanations of operations of the sub bridge circuit 149, a sub differential amplifier 150, a sub rectifying and smoothing circuit 151, and an LPF 152 will be omitted here, because their operations are the same as those of the main bridge circuit 145 to the LPF 148.

The torque calculating circuit 153 is provided with a multiplexer (MUX) and an AD converter (ADC), and calculates a torque detecting signal based on signals (MAIN torque value and SUB torque value) output from the LPFs 148 and 152 to output it to a communication output circuit 154, which constitutes the communication output unit. The communication output circuit 154 outputs the torque detecting signal calculated by the torque calculating circuit 153 to the controller (ECU) 15.

The monitoring units of the diagnostic device 160 include: a magnetization pulse monitoring unit 161 for monitoring a magnetization pulse; a magnetization signal monitoring unit 162 for monitoring waveforms (frequency, DUTY, shape, offset, reduction, excessive oscillation, etc.) of the magnetization signal; a phase monitoring unit 163 for monitoring a phase of the magnetization signal; a differential amplitude monitoring unit 164 for monitoring an amplitude of the signal output from the differential amplifier 150; a MUX/ADC monitoring unit 165 for monitoring abnormality of the MUX and the ADC of the torque calculating circuit 153; a torque signal monitoring unit 166 for monitoring a torque detecting signal output from the torque calculating circuit 153, and a communication monitoring unit 167 for monitoring abnormality of the communication output unit 154. Various monitoring processes are carried out routinely during the steering auxiliary control, and when a certain abnormality is detected, it is then transmitted to the ECU 15 shortly thereafter.

Furthermore, the diagnostic device 160 is provided with an initial diagnostic unit 168 for diagnosing each monitoring unit. Immediately after power supply is switched on (or immediately after the ignition switch 18 is turned on) and before the ECU 15 side starts steering auxiliary control, the initial diagnostic unit 168 starts operation, and conducts initial diagnosis for diagnosing whether each monitoring unit is operating normally. This initial diagnosis subjects each monitoring unit to diagnosis successively. Moreover, setting a flag during initial diagnosis prevents the ECU 15 from using a torque sensor signal (i.e., prevents the steering auxiliary control.)

Once the initial diagnostic unit 168 starts an initial diagnosis, a normal and an abnormal signal as initial diagnosis signals are alternately input to each of the monitoring units to be diagnosed, and confirms that each of the monitoring units is operating normally. In this situation, the normal signal denotes a "normal" (i.e., diagnosis indicates it is normal) signal with the diagnostic result from a monitoring block that is functioning normally, when that signal is to be monitored, whereas the abnormal signal denotes an "abnormal" (i.e., diagnosis indicates it is abnormal) signal with the diagnostic result from the monitoring block that is functioning normally, when that signal is to be monitored.

Figure 10:
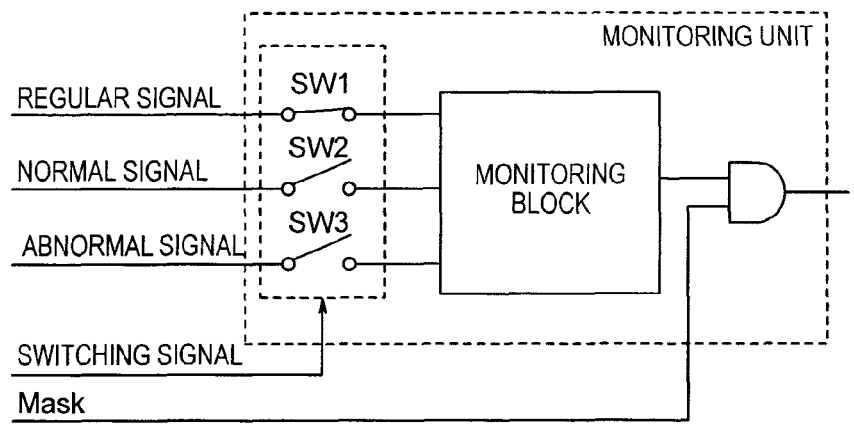
FIG. 10 is a block diagram for explaining a concept of an initial diagnostic method.

As illustrated in FIG. 10, in a regular monitoring mode (regular diagnostic mode), a switch SW1 is turned on, and a regularly monitored signal (regular signal) is input to a monitoring block to diagnose the regular signal.

On the other hand, each of switches SW1 to SW3 is turned on or off in response to a switching signal at the initial diagnosis to input an initial diagnosis signal to the monitoring block. In the present embodiment, a normal signal, an abnormal signal, and a normal signal are input in this order as signals for the initial diagnosis. When inputting a normal signal, the switch SW2 is turned on, whereas when inputting an abnormal signal, the switch SW3 is turned on.

The output from the monitoring block is set to "0" when diagnosed as normal, whereas it is set to "1" when diagnosed as abnormal. The output from the monitoring block is input to an AND circuit. The AND circuit performs a logical AND operation of the output from the monitoring block and a flag mask Mask, and then outputs the resulting value as a final output signal from the monitoring unit. The flag mask Mask is used for selecting the monitoring unit to be diagnosed, and in the regular diagnostic mode, the Masks for all the monitoring blocks are set to "OFF (i.e., 1)". On the other hand, in the initial diagnostic mode, only Masks for the monitoring blocks to be diagnosed are set to "OFF (i.e., 1)", and Masks for the other monitoring blocks not to be diagnosed are set to "ON (i.e., 0)".

Figure 11:
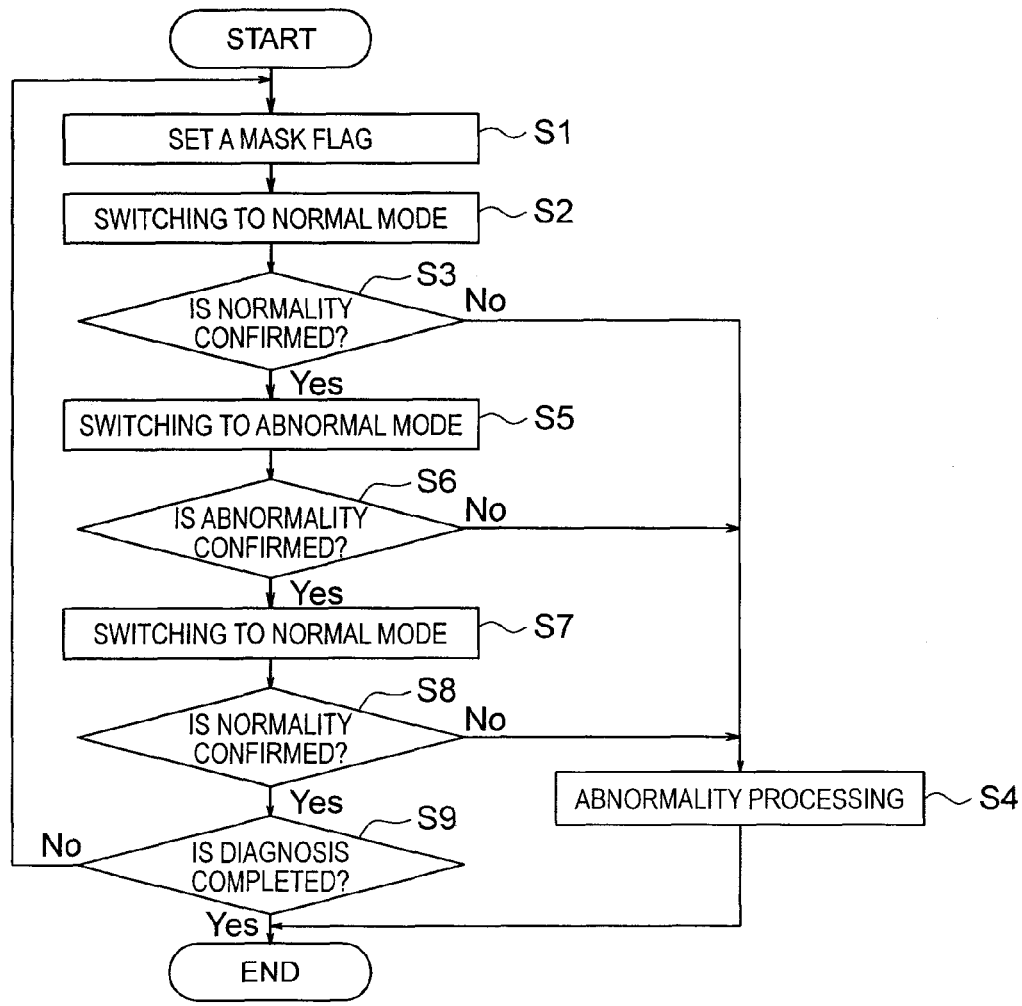
FIG. 11 is a flow chart of initial diagnostic processing steps executed by an initial diagnostic unit.

FIG. 11 is a flow chart of initial diagnostic process steps executed by the initial diagnostic unit 168. As described above, the initial diagnostic process is carried out immediately after the power is turned on and before the ECU 15 starts the steering auxiliary control.

First of all, in Step S1, the initial diagnostic unit 168 turns "off (i.e., 1)" only the flag masks for monitoring blocks to be subjected to the initial diagnosis, whereas it turns "ON (i.e., 0)" the flag masks for the other monitoring blocks. Turning "off (i.e., 1)" only the flag masks for the target monitoring blocks in this manner makes outputs from the other monitoring units (see output from the AND gate in FIG. 10) "0" irrespective of the outputs from the other monitoring blocks (i.e., the monitoring functions of the monitoring blocks are made invalid). Note that monitoring blocks that need a flag mask are those of the magnetization pulse monitoring unit 161, the magnetization signal monitoring unit 162, the phase monitoring unit 163, the differential amplitude monitoring unit 164, and the torque signal monitoring unit 166.

In Step S2, the initial diagnostic unit 168 inputs a normal signal for the initial diagnosis of the monitoring block to be subjected to the initial diagnosis (i.e., the switch SW2 in FIG. 10 is turned on) to switch to the initial diagnostic normal mode, and processing then proceeds to Step S3.

In Step S3, the initial diagnostic unit 168 stands by until the initial diagnostic normal mode becomes stable, reads the outputs from all of the monitoring units, and determines whether or not all of the outputs are "0" and that no abnormality has occurred. At this time, when the occurrence of an abnormality is confirmed, it is determined that the monitoring function of that monitoring unit has an abnormality, and processing then proceeds to Step S4. In Step S4, a predetermined abnormality process (e.g., notification of the abnormality by the communication output circuit 154 etc.) is carried out, and the initial diagnostic process ends.

On the other hand, when it is determined in step S3 that no abnormality has occurred, processing proceeds to Step S5. In Step S5, the initial diagnostic unit 168 inputs the abnormal signal for the initial diagnosis to the monitoring blocks to be subjected to the initial diagnosis (the switch SW3 in FIG. 10 is turned on) to switch to an initial diagnostic abnormal mode.

Next, in Step S6, the initial diagnostic unit 168 stands by until the initial diagnostic abnormal mode becomes stable, confirms all of the outputs from the monitoring units, and determines whether or not only the output from the target monitoring unit is "1" and an abnormality has occurred. At this time, when it is not determined that an abnormality has occurred, it is determined that the monitoring function of the monitoring unit has an abnormality, and processing proceeds to Step S4.

On the other hand, when it is determined in Step S6 that an abnormality has occurred, processing proceeds to Step S7. In Step S7, the initial diagnostic unit 168 inputs a normal signal for the initial diagnosis to the monitoring block to be subjected to the initial diagnosis (the switch SW2 in FIG. 10 is turned on) to switch to the initial diagnostic normal mode.

Then, in Step S8, the initial diagnostic unit 168 stands by until the initial diagnostic normal mode becomes stable, confirms all of the outputs from the monitoring units, and determines whether or not no abnormality has occurred. When it is determined that an abnormality has occurred, it is determined that there is an abnormality at the monitoring function of the monitoring unit, and processing then proceeds to Step S4. On the other hand, when it is determined in Step S8 that no abnormality has occurred, processing proceeds to Step S9.

In Step S9, the initial diagnostic unit 168 determines whether or not the initial diagnosis of all the monitoring units has ended. When there is a monitoring unit that has not yet been subjected to the initial diagnosis, processing proceeds to Step S1 to switch to another target to be subjected to the initial diagnosis. When the initial diagnosis of all the monitoring units ends, the initial diagnostic process then ends.

In this manner, since there is such an initial diagnostic function for diagnosing the monitoring units themselves, the reliability of the monitoring functions of the monitoring units can be improved. That is, it is possible to prevent a case where the monitoring units is not capable of detecting an abnormality of the signal processing circuit 140 even though the abnormality actually occurs, and a case of erroneously detecting an abnormality occurring in a monitoring unit, although the signal processing circuit 140 is normal. Therefore, it is possible to prevent a malfunction due to the erroneous detection of a monitoring unit.

(Initial Diagnosis by Magnetization Signal Monitoring Unit 162)

An initial diagnostic method for the magnetization signal monitoring unit 162 will be explained below in detail.

Figure 12:
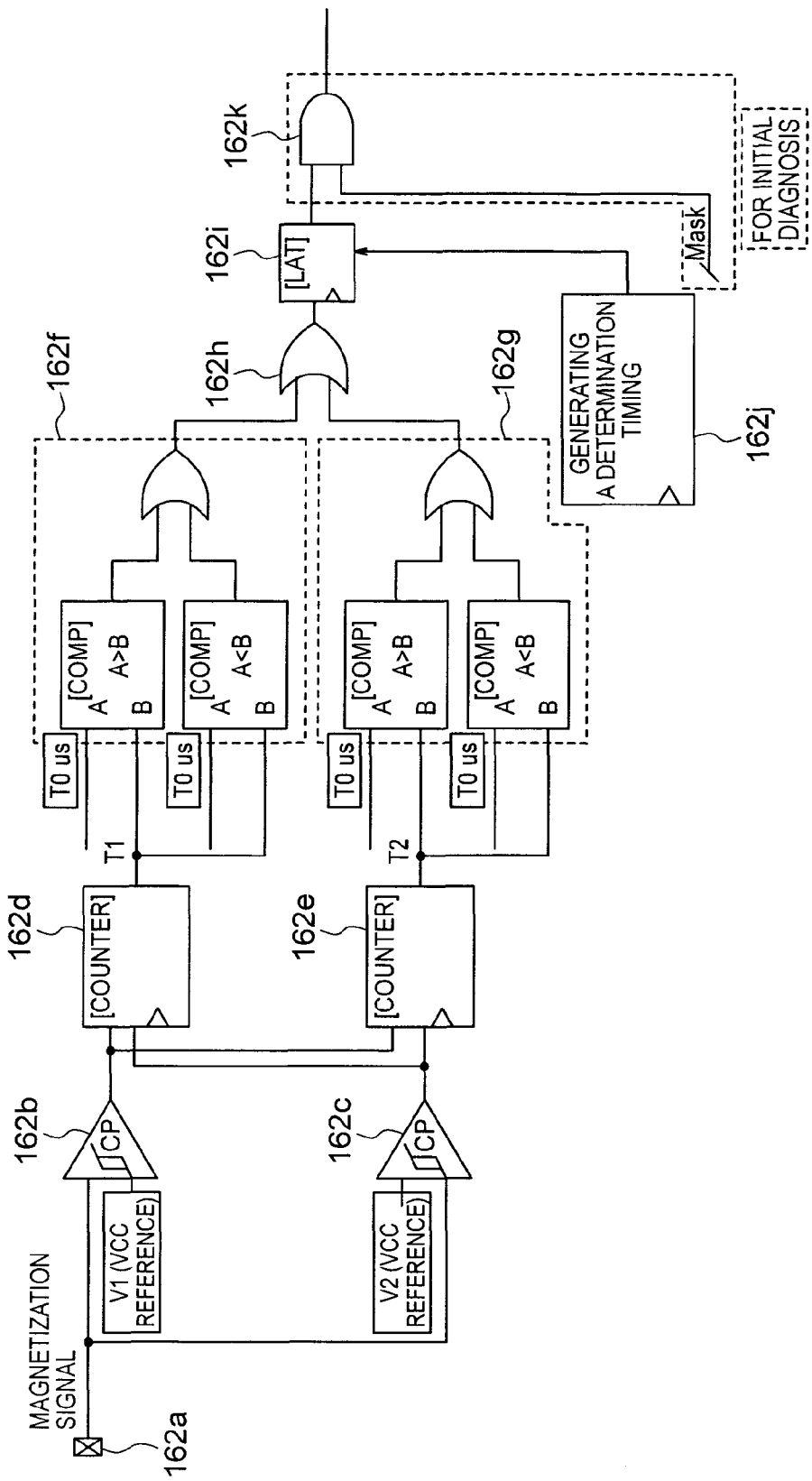
FIG. 12 is a block diagram illustrative of a configuration of a magnetization signal monitoring unit.

FIG. 12 is a view illustrative of a configuration of the magnetization signal monitoring unit 162. Herein, parts corresponding to the monitoring block and the AND circuit in FIG. 10 are illustrated.

The magnetization signal monitoring unit 162 monitors a waveform of a magnetization signal. In the regular diagnostic mode, a magnetization signal output from the magnetization waveform generating unit 144 is input to an input terminal 162a as a regular signal. Moreover, in the initial diagnostic normal mode, a magnetization signal with an ideal waveform is input to the input terminal 162a as a normal signal for the initial diagnosis. On the other hand, in the initial diagnostic abnormal mode, a magnetization signal with a frequency different from the above-mentioned normal signal (e.g., ½ frequency) is input to the input terminal 162a as an abnormal signal for the initial diagnosis.

Figure 13A:
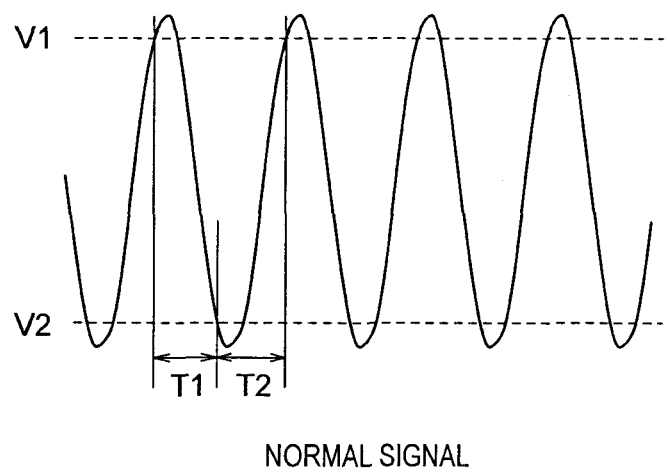
FIG. 13A and FIG. 13B are graphs illustrative of an example of a signal waveform for initial diagnosis of the magnetization signal monitoring unit.
Figure 13B:
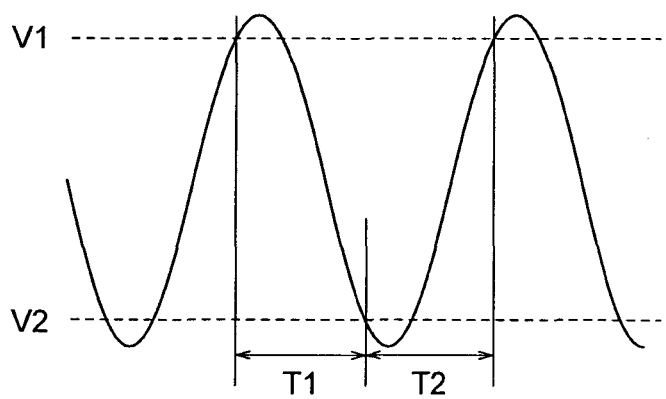

FIG. 13A and FIG. 13B are graphs of signal waveforms for the initial diagnosis. FIG. 13A illustrates a normal signal, while FIG. 13B illustrates an abnormal signal. The magnetization signal monitoring unit 62 counts periods of time T1 and T2, and then compares them to respective predetermined normal values, so as to diagnose. The period of time T1 denotes a period from when a target monitored signal becomes equal to or greater than a threshold V1 to when it becomes equal to or less than a threshold V2. The period of time T2 denotes a period from when it becomes equal to or less than the threshold V2 to when it becomes equal to or greater than the threshold V1. Herein, the threshold V1 is set to 4.25 V, and the threshold V2 is set to 0.75 V, for example.

That is, as illustrated in FIG. 13A and FIG. 13B, the signal input to the input terminal 162a is then input to comparators 162b and 162c. The comparator 162b compares the input signal to the threshold V1, and when the input signal is equal to or greater than the threshold V1, a high level signal is output. Moreover, the comparator 162c compares the input signal to the threshold V2, and when the input signal is equal to or less than the threshold V2, it outputs a high level signal. Output signals from the comparators 162b and 162c are input to counter circuits 162d and 162e, respectively.

The counter circuit 162d counts the period of time T1 from when the input signal becomes equal to or greater than the threshold V1 to when it becomes equal to or less than the threshold V2, based on the output signals from the comparators 162b and 162c, and then outputs the result to a comparator 162f. Moreover, a counter circuit 162e counts the period of time T2 from when the input signal becomes equal to or less than the threshold V2 to when it becomes equal to or greater than the threshold V1, based on the output signals from the comparators 162b and 162c, and then outputs the result to a comparator 162g.

The comparator 162f compares the period T1 to a normal value T0, and when the counted period T1 differs from the normal value T0, a signal of "1" is output. Similarly, the comparator 162g compares the period T2 to the normal value T0, and when the counted period T2 differs from the normal value T0, the signal of "1" is output. Output signals from the comparators 162f and 162g are then input to an OR circuit 162h. An output from the OR circuit 162h is latched by a latch circuit 162i, and input to an AND circuit 162k at a timing specified by a determination timing generating unit 162j.

With such a configuration, the initial diagnostic process of FIG. 11 mentioned above is carried out. Once the flag mask OFF (i.e., 1) is input to the AND circuit 162k of the magnetization signal monitoring unit 162, the normal signal illustrated in FIG. 13A is input from the input terminal 162a, to begin with. In this situation, when the monitoring block is functioning normally, the period of time T1 and the period of time T2 are equal to the normal value T0. The period of time T1 is a period from when the input signal becomes equal to or greater than the threshold V1 to when it becomes equal to or less than the threshold V2, and the period of time T2 is a period from when the input signal becomes equal to or less than the threshold V2 to when it becomes equal to or greater than the threshold V1. Therefore, the output from the latch circuit 162i becomes "0", and the output from the AND circuit 162k also becomes "0".

On the other hand, when the monitoring block is not functioning normally, the period of time T1 and the period of time T2 differ from the normal value T0. The period of time T1 is a period from when the input signal becomes equal to or greater than the threshold V1 to when it becomes equal to or less than the threshold V2, and the period of time T2 is a period from when the input signal becomes equal to or less than the threshold V2 to when it becomes equal to or greater than the threshold V1. Therefore, the output from the latch circuit 162i becomes "1", and the output from the AND circuit 162k also becomes "1."

In this manner, diagnosis is firstly conducted in the initial diagnostic normal mode, and then it is determined whether it is diagnosed as normal correctly (i.e., whether the output from the AND circuit 162k is "0") when a normal signal is input. At this time, when the output from the AND circuit 162k is not "0", it is determined that the magnetization signal monitoring unit 162 is not functioning normally.

When the output from the AND circuit 162k is "0" at the time of inputting the normal signal, and it is determined that the magnetization signal monitoring unit 162 is functioning normally, it is then diagnosed in the initial diagnostic abnormal mode. In this case, the abnormal signal illustrated in FIG. 13B is input from the input terminal 162a. At this time, when the monitoring block is functioning normally, the period of time T1 and the period T2 differ from the normal value T0. The period of time T1 is a period from when the input signal becomes equal to or greater than the threshold V1 to when it becomes equal to or less than the threshold V2, and the period of time T2 is a period from when the input signal becomes equal to or less than the threshold V2 to when it becomes equal to or greater than the threshold V1. Therefore, the output from the latch circuit 162i becomes "1", and the output from the AND circuit 162k also becomes "1".

On the other hand, when the monitoring block is not functioning normally, in some cases, the period of time T1 and the period of time T2 equals the normal value. The period of time T1 is a period from when the input signal becomes equal to or greater than the threshold V1 to when it becomes equal to or less than the threshold V2. The period of time T2 is a period from when the input signal becomes equal to or less than the threshold V2 to when it becomes equal to or greater than the threshold V1. In such a case, the output from the latch circuit 162i becomes "0", and the output from the AND circuit 162k also becomes "0."

In this manner, diagnosis in the initial diagnostic normal mode is conducted followed by diagnosis in the initial diagnostic abnormal mode, and it is determined whether it is correctly diagnosed as abnormal (i.e., whether the output from the AND circuit 162k is "1") when an abnormal signal is input. At this time, when the output from the AND circuit 162k is not "1", it is determined that the magnetization signal monitoring unit 162 is not functioning normally.

Moreover, when the output from the AND circuit 162k is "1" when this abnormal signal is input, and it is determined that the magnetization signal monitoring unit 162 is functioning normally, diagnosis in the initial diagnostic normal mode is conducted again. That is, the normal signal illustrated in FIG. 13A is input from the input terminal 162a again, and it is confirmed whether to be diagnosed as normal correctly (i.e., whether the output from the AND circuit 162k is "0"). At this time, when switching of input signals for the initial diagnosis is performed normally, and the magnetization signal monitoring unit 162 is functioning normally, it is diagnosed as normal correctly. On the other hand, when switching of input signals for the initial diagnosis is not performed normally, diagnosis is not carried out normally even when the magnetization signal monitoring unit 162 is functioning normally. Accordingly, the initial diagnosis by inputting a normal signal, an abnormal signal, and then the same normal signal again, allows confirmation that the initial diagnostic function is operating normally.

As described above, as a magnetization signal monitoring method, there are provided the threshold V1 lower than the maximum value of a target monitored signal, and the threshold V2 higher than the minimum value of a target monitored signal (<V1). The method is employed such that the period of time T1 from when the input signal becomes equal to or greater than the threshold V1 to when it becomes equal to or less than the threshold V2, and the period of time T2 from when the input signal becomes equal to or less than the threshold V2 to when it becomes equal to or greater than the threshold V1 are equal to the normal value, respectively. A signal with a frequency different from that of the normal signal is used as an abnormal signal for the initial diagnosis. In this manner, by the use of an abnormal signal with a frequency different from that of the normal signal, the above-mentioned periods T1 and T2 in the case where the abnormal signal is used as a target monitored signal are made to differ from the normal value. Therefore, it is possible to determine appropriately whether the magnetization signal monitoring unit 162 is functioning normally, using those signals.

Moreover, the abnormal signal for the initial diagnosis can be generated by using a half frequency outputting function of a magnetization pulse generating function. In this manner, it is possible to generate a suitable abnormal signal relatively easily.

(Initial Diagnosis of Phase Monitoring Unit 163)

An initial diagnostic method of the phase monitoring unit 163 will be explained below in detail.

Figure 14:
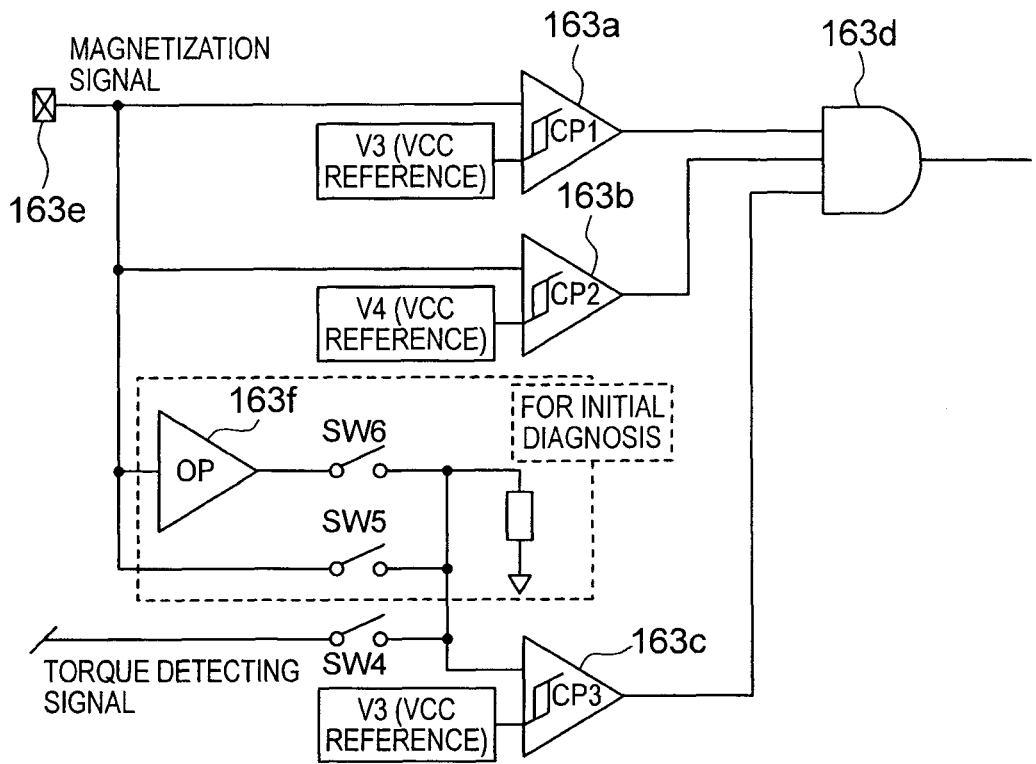
FIG. 14 is a block diagram illustrative of a configuration of a phase monitoring unit.

FIG. 14 is a block diagram illustrative of a configuration of the phase monitoring unit 163. Herein, only a part corresponding to the monitoring block in FIG. 10 is illustrated.

The phase monitoring unit 163 monitors a difference in phase between the torque detecting signal and the magnetization signal in the regular diagnostic mode. Regarding a coil-type torque sensor, in particular, when an abnormality occurs in the coil sensor unit, the torque detecting signal may shift its phase from the magnetization signal. When the phase of the magnetization signal shifts from that of the torque detecting signal and the torque detecting signal has an amplitude equal to or greater than a certain fixed value, it is determined that an abnormality has occurred in the torque detecting signal.

That is, as illustrated in FIG. 14, the monitoring block includes three comparators 163a to 163c, and an AND circuit 163d to which outputs from the comparators 163a to 163c are input. The comparator 163a compares the magnetization signal input from an input terminal 163e to a threshold V3. When the magnetization signal is equal to or greater than the threshold V3, a high level signal is output. Moreover, the comparator 163b compares the magnetization signal input from the input terminal 163e to a threshold V4. When the magnetization signal is equal to or smaller than the threshold V4, a high level signal is output.

Furthermore, the comparator 163c compares the monitored signal to the threshold V3. When the monitored signal is equal to or smaller than the threshold V3, a high level signal is output. In the regular diagnostic mode, the torque detecting signal is input to the comparator 163c as a monitored signal (i.e., a switch SW4 is turned on). Moreover, in the initial diagnostic normal mode, the normal signal for the initial diagnosis is used as a monitored signal and the magnetization signal is input to the comparator 163c as the normal signal (i.e., a switch SW5 is turned on). Then, in the initial diagnostic abnormal mode, the abnormal signal for initial diagnosis is used as a monitored signal and a signal via a phase shift circuit 163f subjected to the phase shifting of the magnetization signal is input to the comparator 163c as the abnormal signal (i.e., a switch SW6 is turned on). The phase shift circuit 163f is a circuit for shifting the phase of the magnetization signal by 90 degrees and is constituted by an operational amplifier, for example.

Note that the thresholds V3 and V4 are set to fall between the minimum amplitude value and the maximum amplitude value of the magnetization signal, respectively, where V3<V4 is satisfied. Herein, the threshold V3 is set to 1.75 V, and the threshold V4 is set to 2.75 V, for example.

Furthermore, herein, the case where the phase difference between the normal signal (magnetization signal) and the abnormal signal is 90 degrees is explained. However, it may take a value other than 90 degrees.

Moreover, the period at high level of the output from the AND circuit 163d is counted and the counted value is then compared to a normal value. When the period at high level is equal to or higher than the normal value, a signal of "1" indicating an abnormality of the torque detecting signal, is input to a circuit corresponding to the AND circuit of FIG. 10.

With such a configuration, the switch SW4 turns on and the torque detecting signal is input to the comparator 163c in the regular diagnostic mode. At this time, when the torque detecting signal is normal where its phase is not shifted from that of the magnetization signal, the output from the AND circuit 163*d* is "0". An operation when it is normal will be explained in detail hereinafter.

As illustrated in FIG. 15A, an output (CP1 output) from the comparator 163*a* is at a high level only during a period when a magnetization signal a is equal to or higher than the threshold V3. Moreover, an output (CP2 output) from the comparator 163*b* is at a high level only during a period when the magnetization signal a is equal to or lower than the threshold V4. Furthermore, an output (CP3 output) from the comparator 163*c* is at a high level only during a period when a monitored signal (i.e., torque detecting signal b) is equal to or lower than the threshold V3. Therefore, when the torque detecting signal b is normal where its phase is not shifted from that of the magnetization signal a, there is no period in which all of the three outputs CP1 to CP3 are at a high level at the same time, as illustrated at the bottom in FIG. 15A. Therefore, the output from the AND circuit 163*d* is always "0" and the torque detecting signal b is determined to be normal.

On the other hand, when such an abnormality that the torque detecting signal has its shifted phase from that of the magnetization signal, there is a period in which the output from the AND circuit 163*d* is at a high level. As illustrated in FIG. 15B, when the monitored signal (i.e., torque detecting signal b') has a phase shifted by 90 degrees from that of the magnetization signal a, the output (CP3 output) from the comparator 163*c* is at a high level at a different timing from that in the normal mode. In this case, there is a period in which all of the outputs CP1 to P3 from the three comparators 163*a* to 163*c* are at a high level. As illustrated in region a of the bottom in FIG. 15B, there is a period in which the output from the AND circuit 163*d* is at a high level. When this period is determined to be equal to or higher than a normal value, it is determined that an abnormality has occurred in the torque detecting signal b'.

By monitoring the output from the AND circuit 163*d* in such a manner, it is possible to determine whether the monitored signal has a phase shifted from that of the magnetization signal appropriately.

Once the aforementioned initial diagnostic process in FIG. 11 is performed and a flag mask OFF (i.e., 1) is input to the phase monitoring unit 163, first of all, the switch SW5 in FIG. 14 turns on and a magnetization signal is input to the comparator 163*c* as a normal signal for the initial diagnosis. That is, the magnetization signal serves as a monitored signal. Naturally, since the monitored signal has the same phase with that of the magnetization signal, the output from the AND circuit 163*d* is always "0" as long as the monitoring block is functioning normally.

On the other hand, when the monitoring block is not functioning normally, it will be misunderstood that the monitored signal shifts its phase from that of the magnetization signal. Thus, there is a period in which the output from the AND circuit 163*d* is at a high level.

In this manner, diagnosis is firstly conducted in the initial diagnostic normal mode to confirm whether the normal signal (magnetization signal) is diagnosed as normal correctly when it is input (i.e., whether the output from the AND circuit 163*d* is always "0"). At this time, when the output from the AND circuit 163*d* is not always "0", it is determined that the phase monitoring unit 163 is not functioning normally.

When this normal signal is received, the output from the AND circuit 163*d* is always "0", and when it is determined that the phase monitoring unit 163 is functioning normally, diagnosis will then be conducted in the initial diagnostic abnormal mode. In this case, the switch SW6 in FIG. 14 is turned onto input to the comparator 163*c* a signal having a phase shifted from that of the magnetization signal, as an abnormal signal for the initial diagnosis. At this time, since the target monitored signal has a different phase from that of the magnetization signal, there is a high level period in the output from the AND circuit 163*d* as long as the monitoring block is functioning normally.

On the other hand, in the case where the monitoring block is not functioning normally, it is misunderstood that the target monitored signal has the same phase with that of the magnetization signal, thereby making the output from the AND circuit 163*d* always "0".

In such a manner, the diagnosis in the initial diagnostic normal mode is conducted followed by diagnosis in the initial diagnostic abnormal mode. Once an abnormal signal is input, it is determined whether an abnormality is diagnosed correctly (i.e., whether the output from the AND circuit 163*d* is at a high level). At this time, when the output from the AND circuit 163*d* is always "0", it will be determined that the phase monitoring unit 163 is not functioning normally.

When there is a high level period in the output from the AND circuit 163*d* at the time of inputting the abnormal signal and it is thus determined that the phase monitoring unit 163 is functioning normally, the diagnosis is conducted again in the initial diagnostic normal mode. That is, the switch SW5 of FIG. 14 is turned on, a magnetization signal is input to the comparator 163*c* again as a normal signal for the initial diagnosis to confirm whether it is diagnosed as normal correctly (whether the output from the AND circuit 163*d* is always "0").

As mentioned above, as a phase monitoring method, there are provided three comparators 163*a* to 163*c*, each of which outputs a high level value within a period in which the magnetization signal is equal to or higher than the threshold V3, a period in which the magnetization signal is equal to or lower than the threshold V4, and a period in which the monitored signal is equal to or lower than the threshold V3, to determine whether all of the outputs from the three comparators 163*a* to 163*c* falling within a high level period are equal to a normal value or greater respectively at the same time. A signal with a different phase from that of the normal signal is used as the abnormal signal for the initial diagnosis. By the use of the signal with a phase different from that of the normal signal in such a manner, it is possible to generate a period in which all the outputs from the three comparators 163*a* to 163*c* are at a high level at the same time, when the abnormal signal is used as a target monitored signal.

At this time, phase difference is set to 90 degrees between the normal signal and the abnormal signal when the abnormal signal is used as a monitored signal. This makes it possible to set all of the outputs from the three comparators 163*a* to 163*c* within a high level period at a normal value or greater with certainty. Therefore, the use of such a signal allows appropriate determination of whether the phase monitoring unit 163 is functioning normally. Moreover, a suitable abnormal signal is obtainable relatively easily by shifting the phase of the normal signal via the phase shift circuit.

(Initial Diagnosis of MUX/ADC Monitoring Unit 165)

An initial diagnostic method of a MUX/ADC monitoring unit 165 will be explained now in detail.

Figure 16:
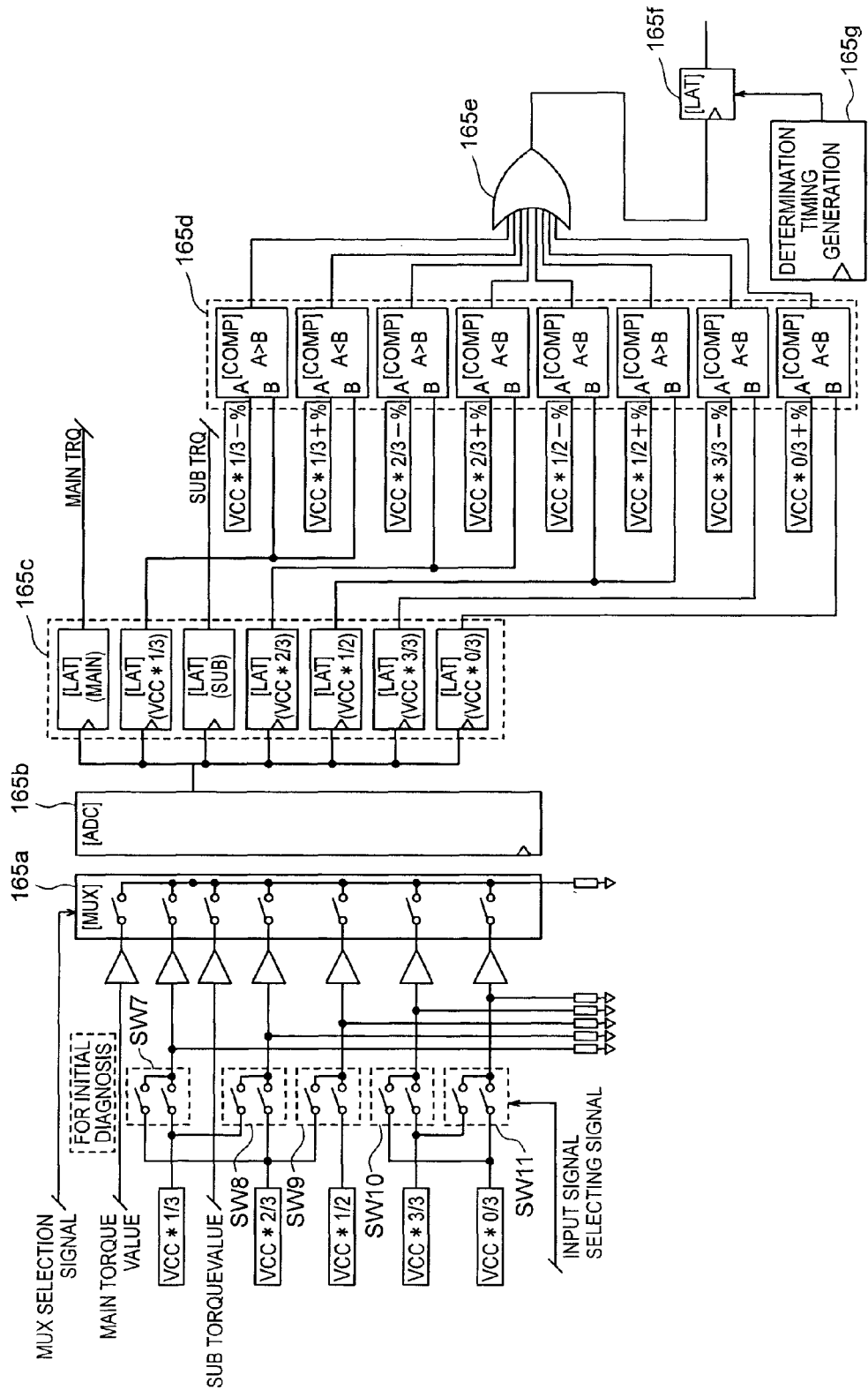
FIG. 16 is a block diagram of a configuration of a torque signal monitoring unit.

FIG. 16 is a block diagram of a configuration of the MUX/ADC monitoring unit 165. Herein, only a part corresponding to the monitoring block in FIG. 10 is illustrated.

The MUX/ADC monitoring unit 165 determines that an abnormality has occurred in the MUX and the ADC, and outputs a signal of "1", when the ADC output value differs from an expected value. Herein, multiple voltages (VCC*1/2, VCC*1/3, VCC*2/3, VCC*3/3, and VCC*0/3) in a regularly used region (0 to VCC) are used as monitored signals, and ADC output values thereof are compared to respective expected values.

That is, as illustrated in FIG. 16, the monitoring block is provided with an MUX 165a and an ADC 165b. In the regular diagnostic mode, VCC*1/3, VCC*2/3, VCC*1/2, VCC*3/3, and VCC*0/3, in addition to a main torque value and a sub torque value, are input to the MUX 165a. The MUX 165a chooses these signals successively according to an Mux selection signal to output to an ADC 165b. The ADC 165b carries out A/D conversion of a signal input from the MUX 165a to output to a latch circuit 165c corresponding to the input signal.

The main torque value and sub torque value latched by the latch circuit 165c are output to the communication output circuit 154 mentioned above. On the other hand, the ADC output value for each input voltage latched by the latch circuit 165c is then output to a comparator 165d. The comparator 165d compares each ADC output value to an expected value, and the result thereof is then output to an OR circuit 165e. The output from the OR circuit 165e is "1" when at least one of the ADC output values is "1." The output from the OR circuit 165e is latched by a latch circuit 165f, and then input to a circuit corresponding to the AND circuit in FIG. 10 at a timing specified by a determination timing generating unit 165g.

In the initial diagnostic normal mode, as a normal signal for initial diagnosis, voltage values (VCC*1/3, VCC*2/3, VCC*1/2, VCC*3/3, and VCC*0/3) equal to those in the regular diagnostic mode are input to respective input terminals of the MUX 165a, and the ADC output value is monitored using these voltage values as monitored signals.

On the other hand, in the initial diagnostic abnormality mode, a voltage value different from that in the regular diagnostic mode is input as an abnormal signal for the initial diagnosis to each input terminal of the MUX 165a, and the ADC output value is monitored using these voltage values as monitored signals.

That is, switches SW7 to SW11, each being switchable according to an input signal selecting instruction, are provided on the previous stage of the MUX 165a, as an abnormality generating circuit. Herein, the input signal selecting instruction is an instruction signal, which makes each lower switch turn on in the regular diagnostic mode and in the initial diagnostic normal mode, and makes each upper switch turn on in the initial diagnostic abnormal mode.

With such a configuration, in the initial diagnostic abnormality mode, VCC*1/3 and VCC*2/3, and VCC*3/3 and VCC*0/3 are input to the MUX 165a alternately, and VCC*2/3 is input from the input terminal of VCC*1/2. Therefore, when the ADC output value is monitored in this mode, the output value from the comparator 165d is "1" indicating abnormality, and thus the output from the OR circuit 165e is also "1" indicating abnormality.

When the torque output is zero (i.e., a neutral value), the torque output value is equal to ½ VCC. Moreover, even when an abnormality occurs in the MUX 165a or the ADC 165b, the ADC output value will be the same value as the neutral value. Therefore, when an abnormality occurs in the MUX 165a or the ADC 165b, there is a possibility that it is erroneously detected as in a neutral mode even when the torque output is made in actuality. Moreover, in the initial diagnosis, when only 1/2 VCC is used as a normal signal and even when an abnormality occurs in the MUX 165a or the ADC 165b, normality will be determined erroneously.

Therefore, in the present embodiment, an initial diagnosis is conducted in a regularly used region, such as not only ½ VCC but also ⅓ VCC or ⅔ VCC. This allows appropriate diagnosis of whether or not the MUX/ADC monitoring unit 165 is functioning normally. Therefore, it is possible to prevent an erroneous detection to be in the neutral mode, although the torque output is made in actuality.

As mentioned above, immediately after the power is turned on but before the ECU side starts control, the initial diagnosis of the monitoring unit itself for monitoring the signal processing circuit 140 is conducted. The confirmation that normal operations of all of the monitoring units is notified to the ECU side, so that the torque sensor 20 then starts its operation and the ECU side starts its steering auxiliary control. As a result, the reliability of the monitoring units can be improved, and erroneous detection by the monitoring units can be suppressed. This allows the steering auxiliary control with the use of the torque detecting device 30 with high reliability, thereby enhancing stability and reliability of the control.

Moreover, as an initial diagnostic method of the monitoring units, there is provided a method of inputting a normal signal and an abnormal signal alternately, diagnosing the normality when the normal signal is input, and determining that an abnormality is diagnosed at the time of inputting an abnormal signal. It is therefore possible to determine whether the monitoring units are operating normally appropriately. Furthermore, after the normal signal and the abnormal signal are input, the normal signal is input again for the initial diagnosis. Therefore, it is possible to determine whether the initial diagnostic function is operating normally, such as whether switching of the input signals for the initial diagnosis is carried out normally, appropriately.

Third Embodiment

A third embodiment according to the present invention will be described below.

The third embodiment differs from the first embodiment mentioned above in the configuration of the torque detecting device 30.

Figure 17:
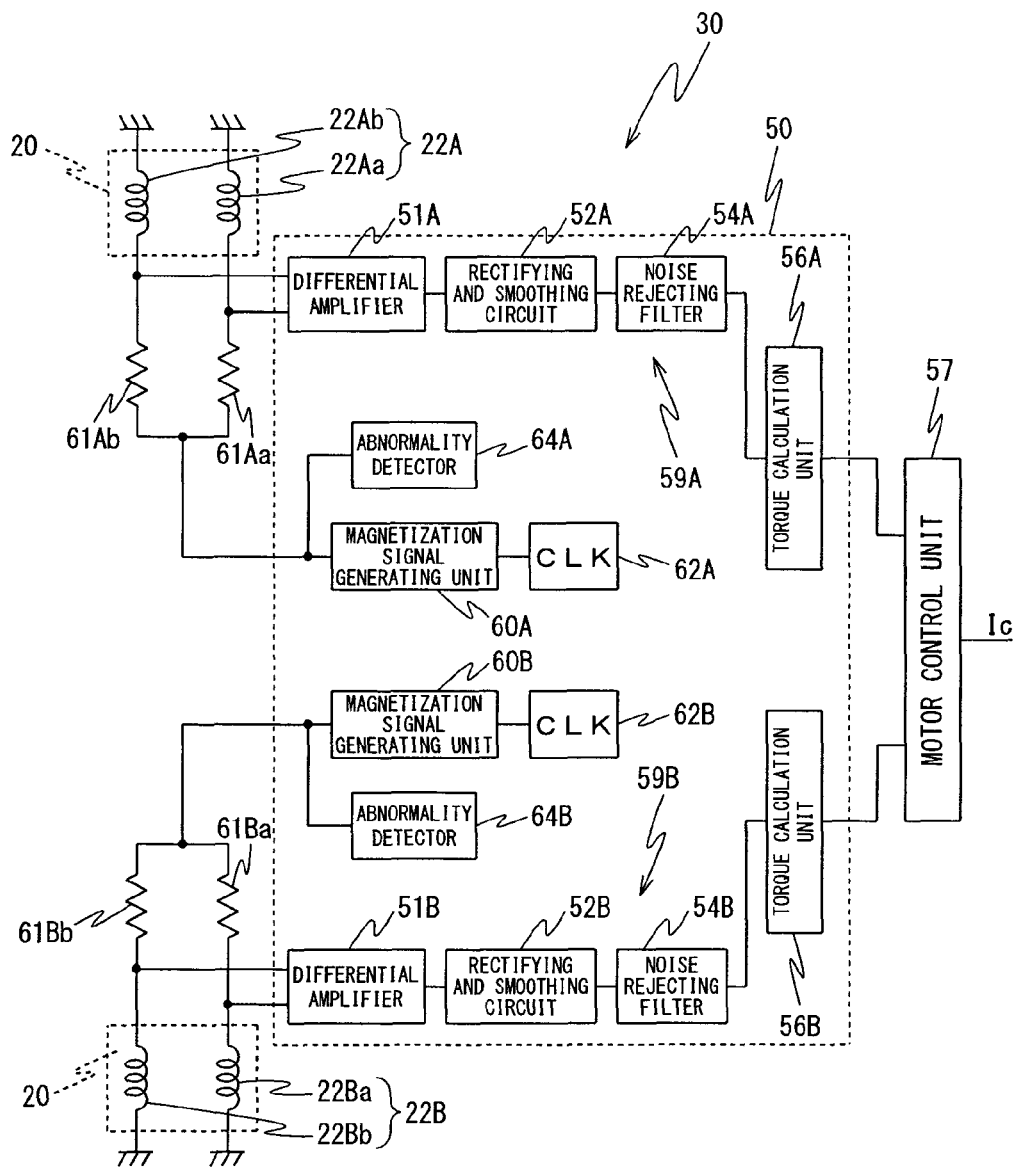
FIG. 17 is a block diagram of a configuration of a torque detecting device according to a third embodiment.

FIG. 17 is a block diagram of a configuration of the torque detecting device 30. The torque detecting device 30 is arranged to correspond to each of the coil pairs 22A and 22B, and includes signal processing circuits (signal processing units) 59A and 59B for processing the output signals from the respective coil pairs. The signal processing units 59A and 59B are provided in the controller 15.

The torque detecting device 30 has a redundant configuration including: a first torque detection system, which includes the first coil pair 22A and the signal processing circuit 59A; and a second torque detection system, which includes the second coil pair 22B and the signal processing circuit 59B. In FIG. 17, parts having the same configuration as those in the torque detecting device 30 are given with the same reference numerals, respectively, and part having a different configuration will be focused on and explained.

Moreover, the torque detecting device 30 includes clock signal generating circuits (CLK) 62A and 62B, each outputting a clock signal to be a source of sinusoidal waves generated by magnetization signal generating units 60A and 60B. The clock signals generated by the clock signal generating circuits 62A and 62B are supplied to the magnetization signal generating units 60A and 60B, respectively.

Herein, each of the clock signal generating circuits 62A and 62B uses an inexpensive clock oscillator, such as a CR oscillator, for example. This CR oscillator may generate a frequency fluctuation exceeding a tolerant frequency range (e.g., +−20%).

Therefore, abnormality detectors 64A and 64B are needed for detecting whether the frequency fluctuation of each of the clock signals generated by the clock signal generating circuits 62A and 62B falls within a tolerant range.

Figure 18:
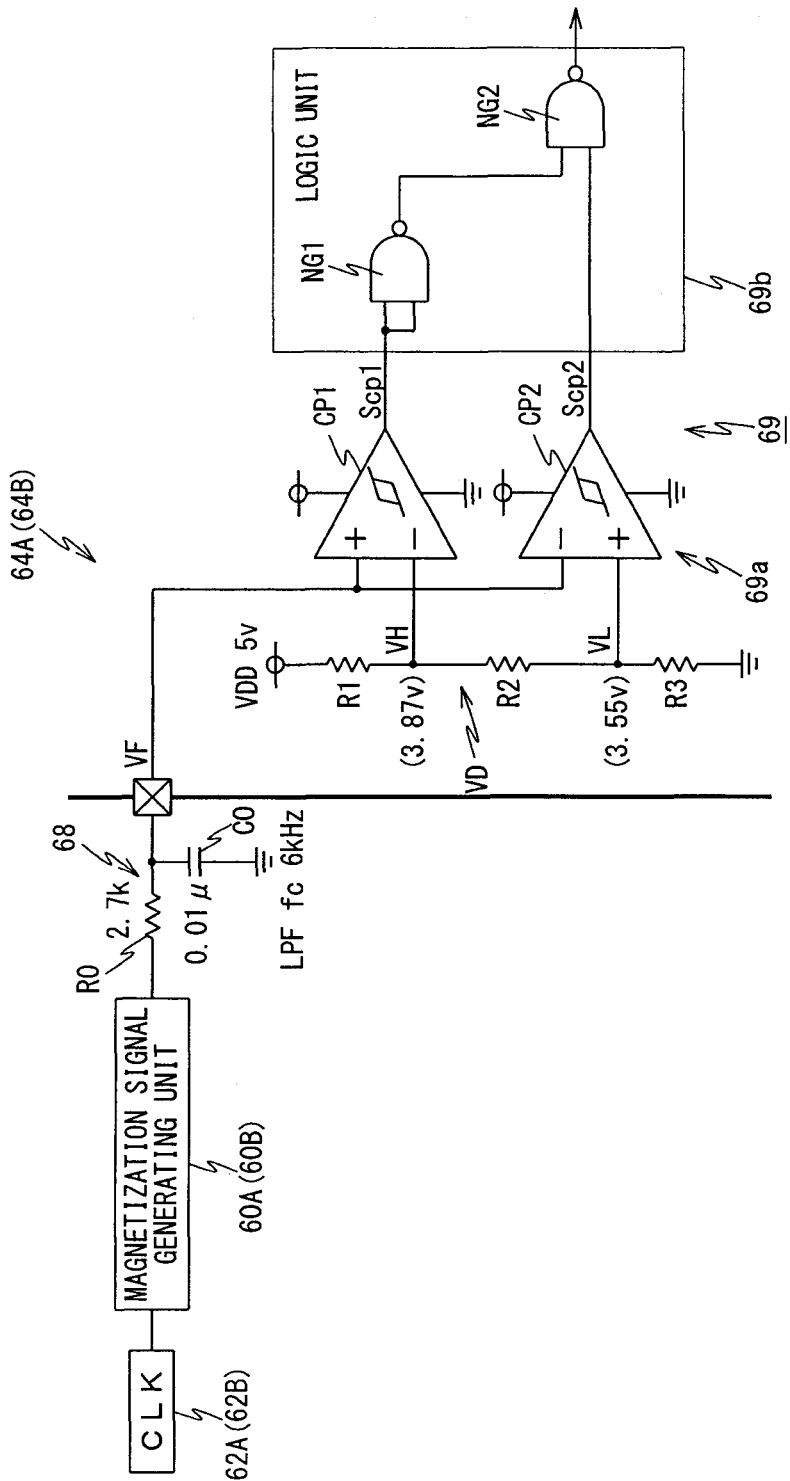
FIG. 18 is a block diagram of a detailed configuration of an abnormality detector.

As illustrated in FIG. 18, each of the abnormality detectors 64A and 64B includes: a low-pass filter (a monitoring low-pass filter) 68, to which sine wave signals output from the magnetization signal generating units 60A and 60B are supplied; and a clock frequency fluctuation monitoring unit 69 for detecting fluctuation of amplitude of a filter output VF from the low-pass filter 68, and detecting fluctuation of amplitude of each of the clock signals.

Figure 19:
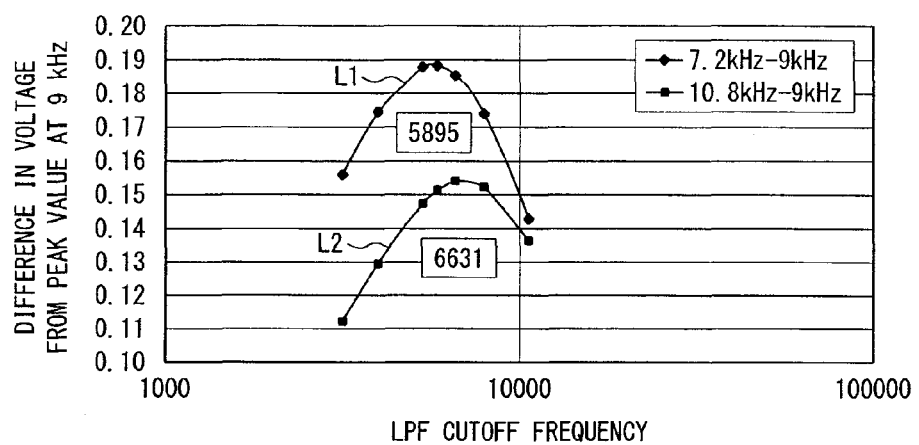
FIG. 19 is a graph illustrative of characteristic curves representing a relationship between a cutoff frequency of a low-pass filter and difference in voltage from peak value at 9 kHz.

The low-pass filter 68 includes a resistor R1 and a capacitor C1. A cutoff frequency fc of the low-pass filter 68 is set to a value in the vicinity of 6 kHz, for example, to attenuate each of the sine wave signals based on respective clock signals with a set frequency of 9 kHz. The reason why the cutoff frequency fc of the low-pass filter 68 is set to the value in vicinity of 6 kHz is that for example, when a frequency fluctuation range from +−20% with respect to 9 kHz magnetization signal is monitored, a relationship between the cutoff frequency fc of the first-order low-pass filter 68 and the difference in voltage from the peak value at 9 kHz is illustrated in FIG. 19. That is, as indicated by a characteristic curve L1, the difference in voltage at 5895 Hz is a peak value within the range between 9 kHz and 7.2 kHz, which is −20% of 9 kHz. On the other hand, as indicated b a characteristic curve L2, the difference in voltage at 6631 Hz is a peak value within the range between 9 kHz and 10.8 kHz, which is +20% of 9 kHz. Therefore, 6 kHz, which is approximately a middle value between the peak along the characteristic curve L1 and that along the characteristic curve L2, is chosen as the cutoff frequency fc of the low-pass filter 68 for monitoring the frequency fluctuation range of +−20%. Thereby, it is possible to replace the frequency fluctuation with the amplitude fluctuation efficiently.

As illustrated in FIG. 20A to FIG. 20D, by the low-pass filter 68 attenuating the magnetization signal of a sinusoidal wave with a high frequency in this manner, the frequency fluctuation of the clock signal of the filter output VF from the low-pass filter 68 is represented as the amplitude fluctuation. That is, as illustrated in FIG. 20B, when tolerance for frequency fluctuation of the clock signal is set to the range of +−20% and the frequency fluctuation of the clock signal falls within +−20%, as illustrated in FIG. 20B, the peak value along the upper half wave of the filter output VF falls within the range of an upper-limit voltage setting value VH (e.g., 3.87V) and a lower-limit voltage setting value VL (e.g., 3.55 V). On the other hand, as illustrated in FIG. 20C, in the case where the frequency of the clock signal is lower by 20% or more than a reference frequency fb (i.e., fb−fb×20%), the peak value along the filter output VF is determined to be abnormal, because it exceeds the upper-limit voltage setting value VH. On the contrary, as illustrated in FIG. 20D, in the case where the frequency of the clock signal is higher by 20% or more than the reference frequency fb (i.e., fb−fb×20%), the peak value along the filter output VF is determined to be abnormal because it is lower than a lower-limit voltage setting value VL.

Therefore, the clock frequency fluctuation monitoring unit 69 determines whether or not the peak voltage of the filter output VF from the low-pass filter 68 falls within a normal range between the upper-limit voltage setting value VH and the lower-limit voltage setting value VL, so that whether or not the frequency fluctuation of the clock signal falls within a tolerance can be detected correctly.

Therefore, as illustrated in FIG. 18, the clock frequency fluctuation monitoring unit 69 includes a window comparator 69a and a logic circuit 69b connected to the output side of the window comparator 69a.

The window comparator 69a includes a voltage divider VD for dividing a direct current power source, and two comparators CP1 and CP2. The voltage divider VD has three resistors R1, R2, and R3 connected in series between a direct current power source terminal VDD and a grounded terminal. The upper-limit voltage setting value VH mentioned above is obtained at a junction point of the resistors R1 and R2, and the lower-limit voltage setting value VL mentioned above is obtained at a junction point of the resistors R2 and R3.

The filter output VF from the low-pass filter 68 is input to a non-inverting input terminal of the comparator CP1, and the upper-limit voltage setting value VH output from the voltage divider VD is input to an inverting input terminal thereof. Moreover, the filter output VF from the low-pass filter 68 is input to the inverting input terminal of the comparator CP2, and the lower-limit voltage setting voltage VL output from the voltage divider VD is input to the non-inverting input terminal.

Therefore, as illustrated in FIG. 20B, regarding the window comparator 69a, when the peak value along the upper half wave of the filter output VF falls within a normal voltage range between the upper-limit voltage setting value VH and the lower-limit voltage setting value VL, the output signal Scp1 from the comparator CP1 is at a low level while the filter output VF exceeds the lower-limit voltage setting voltage VL, and the output signal Scp2 from the comparator CP2 is at a high level since filter output VF is less than the upper-limit voltage setting value VH.

Moreover, as illustrated in FIG. 20C, in the case where the peak value along the upper half wave of the filter output VF exceeds the upper-limit voltage setting value VH, the output signal Scp1 from the comparator CP1 is at a high level while the filter output VF exceeds the upper-limit voltage setting value VH. The output signal Scp2 from the comparator CP2 is also at a high level while the filter output VF exceeds the lower-limit voltage setting value VL.

Furthermore, as illustrated in FIG. 20D, when the peak value along the upper part half wave of the filter output VF is lower than the upper-limit voltage setting value VH, both of the output signal Scp1 of the comparator CP1 and the output signal Scp1 of the comparator CP2 maintain a low level.

Therefore, when the frequency component of the clock signal falls within a normal range, the output signal Scp1 of the comparator CP1 is at a low level, whereas the output signal Scp2 of the comparator CP2 is at a high level.

The logic circuit 69b includes a NAND gate NG1 for receiving the output signal Scp1 of the comparator CP1 at two input terminals thereof, and a NAND gate NG2 for receiving the output signal from the NAND gate NG1 and the output signal Scp2 of the comparator CP2 at two input terminals thereof.

Therefore, in the logic circuit 69b, a low level detection signal is output from the NAND gate NG2, when the frequency component of the clock signal falls within the normal range. On the contrary, a high level detection signal is output from the NAND gate NG2 when the frequency fluctuation is large, such that the frequency component of the clock signal is lower or higher than the normal range, that is, when it is found abnormal.

As mentioned above, the abnormality detectors 64A and 64B each include a clock frequency fluctuation monitoring unit 69 provided with the low-pass filter 68 and the window comparator 69a. The clock frequency fluctuation monitoring unit 69 detects a frequency fluctuation of the clock signal as an amplitude fluctuation of the filter output VF from the low-pass filter 68. When the clock frequency is normal, the output signal output from the clock frequency fluctuation monitoring unit 69 is at a low level. When the clock frequency deviates from a normal range, the output signal output from the clock frequency fluctuation monitoring unit 69 is at a high level.

In general, in order to monitor the accuracy of the clock frequency, there is a technique of providing independently a clock signal generating circuit for monitoring the correctness of the clock frequency based on difference therebetween. However, in the case of using this technique, a high-accuracy clock is needed as a clock for monitoring to monitor the accuracy of the clock frequency of each of the clock signal generating circuits 62A and 62B. This increases the costs, and when an abnormality occurs in the high-accuracy clock signal generating circuit, the abnormality cannot be detected.

Meanwhile, in the present embodiment, an inexpensive CR oscillator is applicable to the clock signal generating circuits 62A and 62B. In this case, monitoring of the clock frequency is possible using the clock frequency fluctuation monitoring unit 69 including the low-pass filter 68 and the window comparator 69a. Therefore, this eliminates the necessity of an expensive clock signal generating circuit independently for monitoring. Consequently, the cost can be reduced by that much.

Note that in the third embodiment, the case where the low-pass filter 68 has a first-order filter configuration including a resistor RO and a capacitor C0 has been described. The present invention, however, is not limited to this configuration. A second-order or higher-filter configuration can be employed to improve the attenuation characteristics as illustrated in FIG. 20A. In addition, it is possible to improve the degree of freedom for design values for amplitude fluctuation of the filter output VF due to frequency fluctuation and accuracy of the elements constituting the low-pass filter.

Fourth Embodiment

A fourth embodiment according to the present invention will be described below.

In the fourth embodiment, diagnosis is given on whether or not the clock frequency fluctuation monitoring unit 69 of the third embodiment is operating normally.

Figure 21:
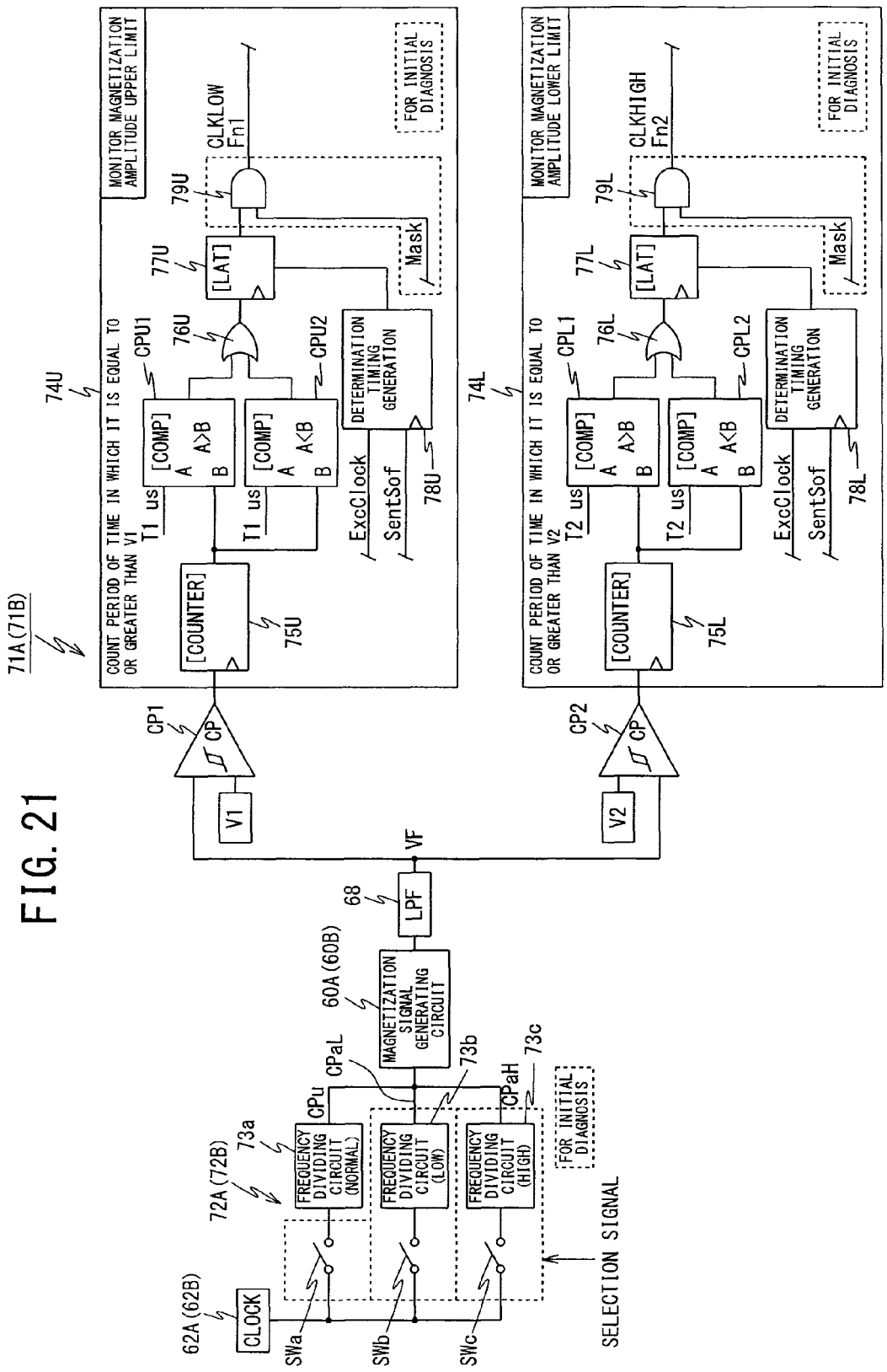
FIG. 21 is a block diagram of a monitoring unit diagnosing unit according to a fourth embodiment.

That is, as illustrated in FIG. 21, in the fourth embodiment, the abnormality detectors 64A and 64B include monitoring unit diagnosing units 71A and 71B, which have an initial diagnostic function for diagnosing whether the clock frequency fluctuation monitoring unit 69 is operating normally.

This initial diagnosis starts immediately after the power of the controller 15 is turned on (i.e., immediately after the ignition switch 18 is turned on) and before the controller 15 starts the steering auxiliary control. Note that the controller 15 is prevented from using the torque sensor signal during the initial diagnosis (i.e., the steering auxiliary control is prohibited) due to a set flag, etc.

As illustrated in FIG. 21, the monitoring unit diagnosing unit 71A (or 71B) includes a clock frequency selecting circuit 72A (or 72B) between the clock signal generating circuit 62A (or 62B) and the magnetization signal generating unit 60A (or 60B). The clock frequency selecting circuit 72A (or 72B) includes: three switches SWa, SWb, and SWc with one ends connected to the clock signal generating circuit 62A (or 62B); and frequency dividers 73a, 73b, and 73c connected to the other respective ends of the switches SWa, SWb, and SWc. Clock signals output from the frequency dividers 73a, 73b, and 73c are input to the magnetization signal generating unit 60A (or 60B).

Herein, the frequency divider 73a generates a regular clock signal CPu with the aforementioned reference frequency fb of 9 kHz to be used usually. Moreover, the frequency divider 73b generates an abnormally low frequency clock signal CPaL set at a frequency lower than the acceptable lower-limit range (−20%), which is usually lower than the regular clock signal CPu. Furthermore, the frequency divider 73c generates an abnormally high frequency clock signal CPaH set at a frequency higher than the acceptable upper-limit range (+20%), which is usually higher than the regular clock signal CPu.

Moreover, the monitoring unit diagnosing unit 71A (or 71B) includes comparators CP1 and CP2 of the window comparator 69a of the clock frequency fluctuation monitoring unit 69. A predetermined high voltage V1 illustrated in FIG. 20B is input to the comparator CP1, where the predetermined high voltage V1 is lower than the peak value (which is lower than the upper-limit voltage setting value VH) along the upper half wave of the filter output VF output from the low-pass filter 68 and higher than the lower-limit voltage setting value VL. The filter output VF originates from a sinusoidal wave obtained by the magnetization signal generating units 60A and 60B converting the aforementioned abnormally low-frequency clock signal CPaL. On the other hand, a predetermined low voltage V2 illustrated in FIG. 20B is input to the comparator CP1, where the predetermined low voltage V2 is higher than the peak value along the lower half wave of the filter output VF output from the low-pass filter 68. The filter output VF originates from a sinusoidal wave obtained by the magnetization signal generating units 60A and 60B converting the aforementioned abnormally high-frequency clock signal CPaH.

A comparison output from the comparator CP1 is input to an upper-half wave diagnostic unit 74U for diagnosing based on the upper amplitude part of the magnetization signal, while a comparison output from the comparator CP2 is input to a lower-half wave diagnostic section 74L for diagnosing based on the lower amplitude part of the magnetization signal.

The upper-half wave diagnostic unit 74U includes: a counter 75U to which the comparison output from the comparator CP1 is input; and the comparator CP1 for counting a high-level period of the clock signal. After the counted value CU of the counter 75U converts the aforementioned abnormally low-frequency clock signal CPaL at the magnetization signal generating unit 60A (or 60B) to a sinusoidal wave, it is input to the comparators CPU1 and CPU2 to which is also input the abnormal clock period T1 having the counted value CU corresponding to period in which the upper-half wave of the filter output VF output from the low-pass filter 68 is the predetermined, high voltage V1.

Herein, the comparator CPU1 outputs a high-level comparison signal when the abnormal clock period T1 is longer than the counted value CU. On the other hand, the comparator CPU2 outputs a high-level comparison signal when the abnormal clock period T1 is shorter than the counted value CU.

The comparison signals output from the comparators CPU1 and CPU2 are supplied to a latch circuit 77U. The latch circuit 77U then latches the comparison signals in accordance with a timing signal supplied from a determination timing generating circuit 78U.

The latched signal, which is latched by the latch circuit 77U, is supplied to an AND gate 79U, to which a mask signal that becomes a high level only at the time of initial diagnosis is input. A normality flag Fn1 is reset to "0" indicating an abnormality, when an output from the AND gate 79U is at a low level. On the contrary, the normality flag Fn1 is set to "1" indicating a normality, when the output from AND gate 79U is at a high level.

The lower-half wave diagnostic unit 74L includes a counter 75L to which the comparison output from the comparator CP2 is input, and which counts the high-level period of the clock signal. After the counted value CL of the counter 75L converts the aforementioned abnormally high-frequency clock signal CPaH at the magnetization signal generating unit 60A (or 60B) to a sinusoidal wave, it is input to comparators CPL1 and CPL2 to which the abnormal clock period T2 or the counted value CL corresponding to a period in which the lower-half wave of the filter output VF from the low-pass filter 68 is smaller than the predetermined low voltage V2 is input.

Herein, the comparator CPL1 outputs a high-level comparison signal when the abnormal clock period 12 is longer than the counted value CL. The comparator CPL2 outputs a high-level comparison signal when the abnormal clock period T2 is shorter than the counting value CL.

The comparison signals output from the comparators CPL1 and CPL2 are supplied to a latch circuit 77L. The latch circuit 77L latches the comparison signals in accordance with a timing signal supplied from the determination timing generating circuit 78L.

The latched signal, which is latched by the latch circuit 77L, is supplied to an AND gate 79L, to which a mask signal becomes a high level only at the time of initial diagnosis is input. A normality flag Fn2 is reset to "0" indicating an abnormality, when the output from the AND gate 79L is at a low level. On the contrary, the normality flag Fn2 is set to "1" indicating a normality, when the output from the AND gate 79L is at a high level.

As illustrated in FIG. 21, in the regular monitoring mode (regular diagnostic mode), the switch SWa is turned on to input a regular clock signal to the magnetization signal generating unit 60A (or 60B) and monitor the frequency fluctuation of the clock signal.

On the other hand, each of the switches SWa to SWc is switched on or off in response to a switching signal at the time of the initial diagnosis, so as to input signals for initial diagnosis to the monitoring unit diagnosing unit 71A (or 71B). In the present embodiment, the normal signal, the abnormal signal, and the normal signal are to be input in this order as signals for the initial diagnosis. The switch SWa is turned on for inputting the normal signal, and the switch SWb is turned on followed by the switch SWc sequentially, when inputting the abnormal signal.

Figure 22:
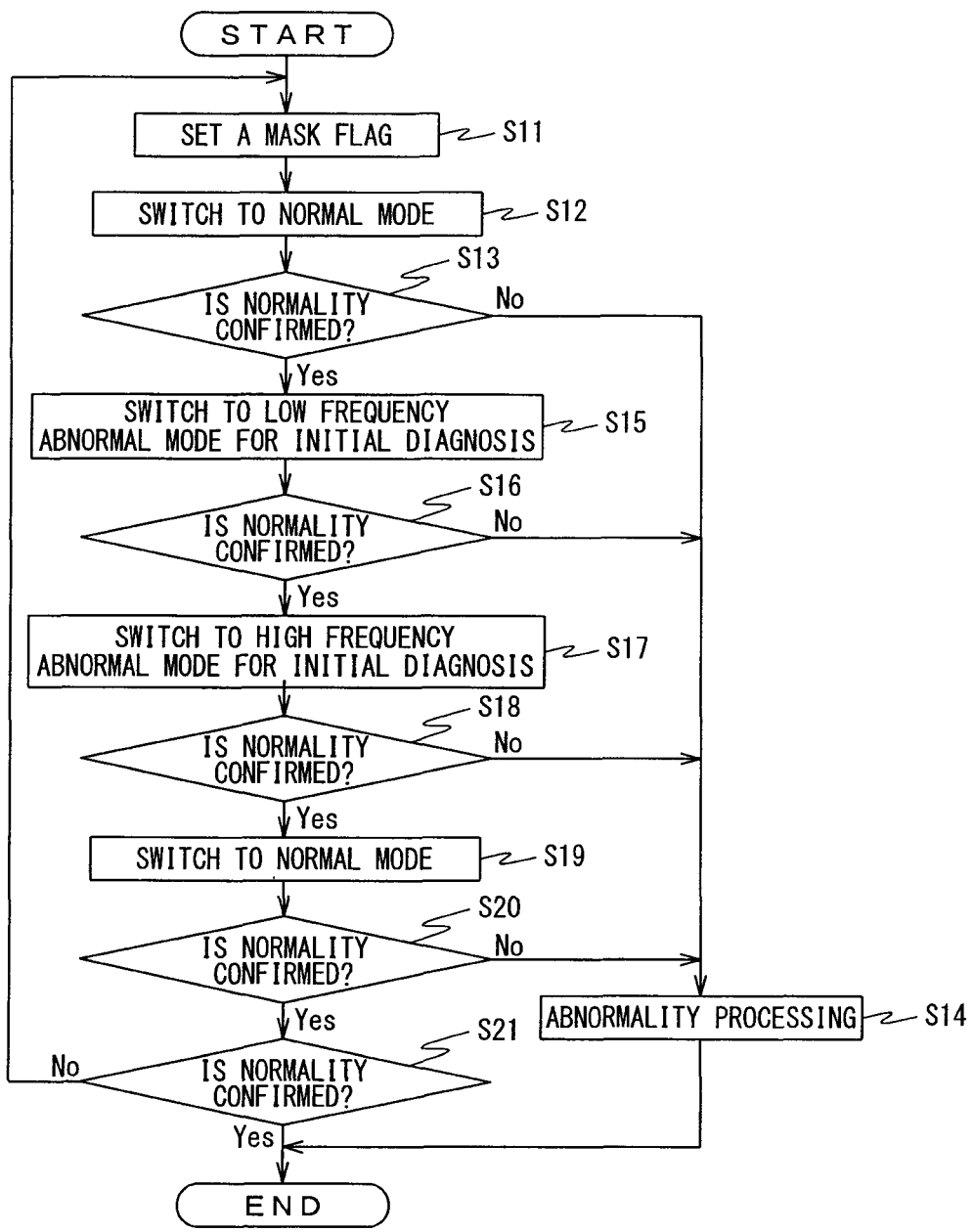
FIG. 22 is a flow chart of initial diagnostic processing steps executed by an initial diagnostic unit.

FIG. 22 is a flow chart of initial diagnostic process steps executed by the monitoring unit diagnosing units 71A and 71B. This initial diagnostic process is performed immediately after the power is turned on and before the ECU 15 starts the steering auxiliary control, as mentioned above.

First of all, the monitoring unit diagnosing units 71A and 71B set the flag mask to "OFF (high level)" in Step S11.

In Step S12, the monitoring unit diagnosing units 71A and 71B enter the initial diagnostic normal mode by the clock signal selection sections 72A and 72B selecting the regular clock signal CPu (i.e., the switch SWa in FIG. 21 is turned on), and processing then proceeds to Step S13.

In Step S13, after the monitoring unit diagnosing units 71A and 71B standby until the initial diagnostic normal mode is stable, they determine whether or not both of the normality flags Fn1 and Fn2 are set to "1" indicating the normal mode.

At this time, when a low-frequency abnormality (or high-frequency abnormality) occurs, the counted value CU (or CL) of the counter 75U (or 75L) is equal to the abnormal clock period T1 (or T2) supplied to the comparators CPU1 and CPU2 (or CPL1 and CPL2) in the upper-half wave diagnostic section 74U (or the lower-half wave diagnostic section 74L). Therefore, the comparison outputs from the comparators CPU1 and CPU2 (or CPL1 and CPL2) are at a low level. Therefore, the low level comparison outputs are latched by the latch circuit 77U (or 77L) in accordance with the timing signal from the determination timing generating circuit 78U (or 78L). As a result, the output from the AND gate 79U (or 79L) is at a low level, and the normality flag Fn1 (or Fn2) is reset to "0" indicating the occurrence of an abnormality.

On the contrary, in the lower-half wave diagnostic section 74L (or 74U), the counting value CL (or CU) of the counter 75L (or 75U) becomes a greater value (or a smaller value) than the abnormal clock period T2 (or T1) supplied to the comparators CPL1 and CPL2 (or CPU1 and CPU2). Accordingly, the comparison output from the comparator CPU1 (or CPL2) is at a high level. Therefore, this high-level comparison output is latched by the latch circuit 77L (or 77U) in accordance with the timing signal from the determination timing generating circuit 78L (or 78U). As a result, the output from the AND gate 79L (or 79U) is at a high level, and the normality flag Fn1 (or Fn2) is set to "1" indicating a normality.

Therefore, since the normality flag Fn1 (or Fn2) is reset to "0" and the normality flag Fn2 (or Fn1) is set to "1", it is determined that the monitoring function of the clock frequency fluctuation monitoring unit 69 has a high frequency abnormality (or low frequency abnormality). Afterwards, processing proceeds to Step S14. A predetermined abnormality process (e.g., notification of the abnormality by a communication output circuit) is carried out in this step, and then the initial diagnostic process completes.

On the other hand, as both of the normality flags Fn1 and Fn2 of the upper-half wave diagnostic section 74U and the lower-half wave diagnostic section 74L are set to "1", it is thus determined in Step S13 that no abnormality has occurred and processing then proceeds to Step S15. In this Step, the monitoring unit diagnosing units 71A and 71B switch to the low frequency abnormality mode for initial diagnosis by the clock signal selecting circuits 72A and 72B selecting the abnormally low frequency clock signal CPaL for the initial diagnosis (i.e., the switch SWb in FIG. 21 is turned on).

In Step S16, the monitoring unit diagnosing units 71A and 71B stand by until the low frequency abnormality mode for initial diagnosis becomes stable. Afterwards, they read in the normality flag Fn1 of the lower-half wave diagnostic section 74H, and determine whether or not the normality flag Fn1 is reset to "0" and whether or not an abnormality has occurred. At this time, when the occurrence of an abnormality cannot be confirmed due to the normality flag Fn1 set to "1", it will be determined that the monitoring function of the clock frequency fluctuation monitoring unit 69 has an abnormality and processing then proceeds to Step S14.

On the other hand, when the normality flag Fn1 is reset to "0" in Step S16 and the occurrence of an abnormality is recognized, processing then proceeds to Step S17. In Step S17, the monitoring unit diagnosing units 71A and 71B switch to the high frequency abnormality mode for the initial diagnosis by the clock signal selecting circuits 72A and 72B selecting the abnormality high frequency clock signal CPaH for the initial diagnosis (i.e., the switch SWc of FIG. 21 is turned on).

In Step S18, the monitoring unit diagnosing units 71A and 71B stand by until the high-frequency abnormality mode for the initial diagnosis become stable, read in the normality flag Fn2 of the upper-half wave diagnostic section 74L, and then determine whether the normality flag Fn2 is reset to "0" and the occurrence of an abnormality is confirmed. At this time, when the normality flag Fn2 is reset to "1" and no occurrence of an abnormality is recognized, it is determined that the monitoring function of the clock frequency fluctuation monitoring unit 69 has an abnormality, and then processing proceeds to Step S14.

On the other hand, when the normality flag Fn2 is set to "0" in Step S18, and the occurrence of an abnormality is recognized, processing then proceeds to Step S19. In Step S19, the monitoring unit diagnosing units 71A and 71B switches to the initial diagnostic normal mode by the clock signal selecting circuits 72A and 72B selecting the regular clock signal CPu (the switch SWa of FIG. 21 is turned on).

Next, in Step S20, the monitoring unit diagnosing units 71A and 71B standby until the initial diagnostic normal mode becomes stable, and they then determine whether both of the normality flags Fn1 and Fn2 are set to "1" in the same manner as in Step S13 and the occurrence of an abnormality is confirmed. When it is confirmed that the normality flag Fn1 (or Fn2) is reset to "0" and an abnormality has occurred, it is determined that there is an abnormality with the monitoring function of the clock frequency fluctuation monitoring unit 69, and then processing proceeds to Step S14.

On the other hand, when it is determined in Step S20 that both of the normal flags Fn1 and Fn2 are set to "1" and that no abnormality has occurred, processing then proceeds to Step S21.

In Step S21, the monitoring unit diagnosing units 71A and 71B determine whether all of the initial diagnoses have been completed. When all the initial diagnoses are not yet completed, processing then returns to Step S11. When all of the initial diagnoses are completed, the initial diagnostic process is then ended.

In this manner, as there is provided the initial diagnostic function for diagnosing the clock frequency fluctuation monitoring unit 69 itself, it is possible to improve the reliability of the monitoring function of the clock frequency fluctuation monitoring unit 69.

Moreover, the diagnosis in the initial diagnostic abnormality mode is performed after diagnosis in the initial diagnostic normal mode to determine whether the abnormality diagnosis is conducted correctly (whether the output from the AND gate 79U (or 79L) is at a low level), when the abnormal clock signal CPaL (or CPaH) is input. At this time, when the output from the AND gate 79U (or 79L) is a high level instead of a low level, it is determined that the clock frequency fluctuation monitoring unit 69 is not functioning normally.

When inputting the abnormal clock signal CPaL (or CPaH), the output from the AND gate 79U (or 79L) is at a low level and when it is determined that the clock frequency fluctuation monitoring unit 69 is functioning normally, the diagnosis in the initial diagnostic normal mode is conducted again. That is, the regular clock signal CPu is input again from each of the clock frequency selecting circuits 72A and 72B to determine whether the abnormality diagnosis is carried out correctly (i.e., the output from each of the AND gates 79U and 79L is at a high level). At this time, when switching of the signals for initial diagnosis is performed normally and the clock frequency fluctuation monitoring unit 69 is functioning normally, the diagnosis is carried out correctly. However, when the signal for initial diagnosis is not selected correctly, the diagnosis is carried out normally, even if the clock frequency fluctuation monitoring unit 69 is functioning normally. In this case, by conducting the initial diagnosis after the regular clock signal CPu and the abnormal clock signals CPaL and CPaH are input in this order followed by inputting the regular clock signal CPu again, it is made possible to determine whether the initial diagnostic function is operating normally.

As mentioned above, according to the diagnostic method of the clock frequency fluctuation monitoring unit 69, there are provided: a setting voltage V1 higher than the peak value within the normal range of the upper-half wave of the filter output VF to be input; and a setting voltage V2 higher than the peak value at the abnormal time along the lower-half wave of the filter output VF to be input. In addition, there are also provided with the regular clock signal CPu and the abnormal clock signals CPaL and CPaH.

In a case where the period in which it is equal to or higher than the setting voltage V1 does not agree with a predetermined abnormal clock period T1, when the regular clock signal CPu is chosen, and the period in which it is equal to or lower than the setting voltage V2 does not agree with the predetermined abnormal clock period T2, it is determined that the clock frequency fluctuation monitoring unit 69 is normal. Moreover, when the abnormally low frequency clock signal CPaL is chosen, and when the period in which it is equal to or higher than the setting voltage V1 does not agree with the predetermined abnormal clock period T1, it is determined that the clock frequency fluctuation monitoring unit 69 is normal. Moreover, when the abnormally high frequency clock signal CPaH is chosen, and when the period in which it is equal to or lower than the setting voltage V2 does not agree with the abnormal clock period T2, it is determined that the clock frequency monitoring unit 65 is normal.

By use of this diagnostic method, it is made possible to determine whether the clock frequency fluctuation monitoring unit 69 is functioning normally. Moreover, when the clock frequency fluctuation monitoring unit 69 has an abnormality, it is determined appropriately whether it is either an abnormally high frequency exceeding an allowable range on the positive side or an abnormally low frequency exceeding the allowable range on the negative side.

Modifications to the Embodiments

Furthermore, in the fourth embodiment described above, the case of inputting the same normal clock period T1 to the comparator CPU1 and CPU2 has been explained. However, the present invention is not limited thereto. That is, the normal clock period to be input to the comparator CPU1 may be set to T1+α (α denotes a predetermined value for determining a dead zone width), and the normal clock period to be input to the comparator CPU2 may be T1−α to provide a dead zone from −α to +α in the normal clock period. Similarly, regarding the comparator CPL1 and CPL2, the abnormality clock period to be input to the comparator CPL1 may be set to T2+β (β denotes a predetermined value for determining a dead zone width), and the abnormal clock period to be input to the comparator CPL2 may be T2−β to provide a dead zone from −β to +β in the abnormal clock period.

Moreover, in the aforementioned fourth embodiment, the case of applying two abnormal clock signals including: the abnormally low frequency clock signal CPaL; and the abnormally high frequency clock signal CPaH for the monitoring unit diagnosing units 71A and 71B has been described. The present invention, however, is not limited to this case. That is, either the abnormally low frequency clock signal CPaL or the abnormally high frequency clock signal CPaH may be omitted to simply determine whether the monitoring unit diagnosing units 71A and 71B are normal.

Fifth Embodiment

A fifth embodiment of the present invention will be described below.

The fifth embodiment differs from the aforementioned first embodiment in the configuration of the torque detecting device 30.

Figure 23:
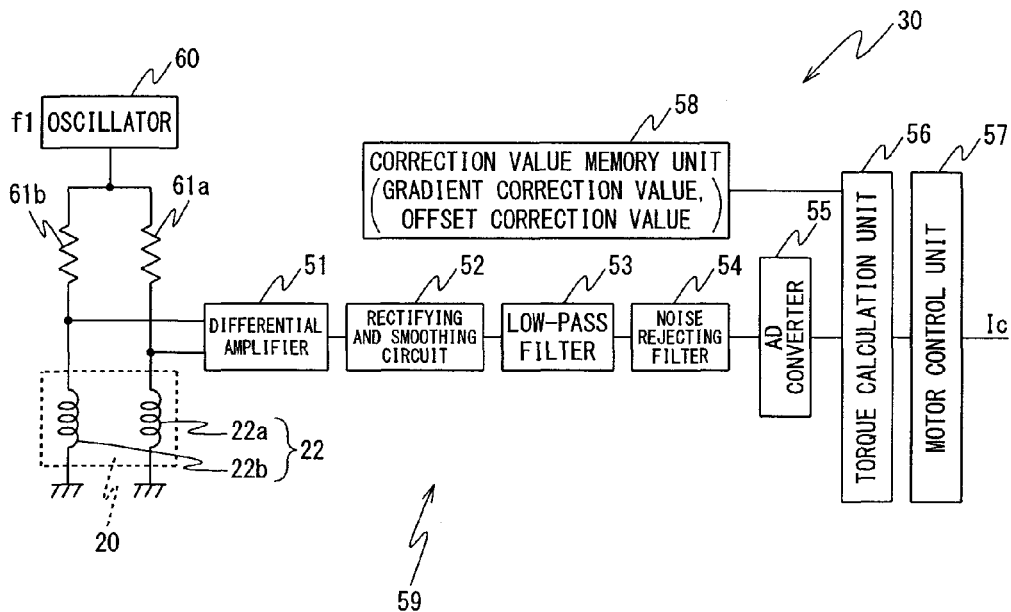
FIG. 23 is a block diagram of a configuration of a torque detecting device according to a fifth embodiment.

FIG. 23 is a block diagram of a configuration of the torque detecting device 30. For simplification of explanation, only either one of the first or the second torque detecting system is illustrated.

The torque detecting device 30 is equipped with a signal processing circuit 59 for signal-processing the output signals from the coil pair 22. The signal processing circuit 59 is deployed in the controller 15. Herein, the output signals from the coil pair 22 are terminal voltages of the coils 22a and 22b, respectively, which constitute the coil pair 22.

The signal processing circuit 59 includes a differential amplifier 51, a rectifying and smoothing circuit 52, a low-pass filter 53, a noise rejecting filter 54, an A/D conversion unit (AD converter) 55, a correction value memory unit (memory unit) 58, a torque calculation unit 56, and a motor control unit 57. Note that the low-pass filter 53 may be embedded in the rectifying and smoothing circuit 52. Herein, since the structure except for the A/D conversion unit 55 and the correction value memory unit 58 is the same as the signal processing circuits 59A and 59B in FIG. 2, the descriptions thereof will be omitted, and different parts are focused on and will be discussed.

The A/D conversion unit 55 converts an analog signal output from the noise rejecting filter 54 to a digital signal, and outputs the digital signal to the torque calculation unit 56, to be described later. The correction value memory unit 58 stores an offset correction value and a gradient correction value beforehand.

Herein, the offset correction value and the gradient correction value are an offset and a gradient, respectively, used for making the digital torque waveform obtained by A/D-converting an analog torque signal to a digital value to correspond to a predetermined torque waveform.

Figure 24A:
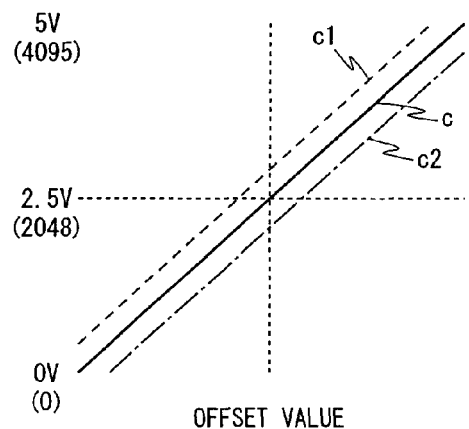
FIG. 24A and FIG. 24B are graphs illustrative of a set gain value and a set offset value.

That is, when a positive offset is given to the digital torque waveform before correction indicated by a solid line c in FIG. 24A, the corrected digital torque waveform is indicated by a dashed line c1 in FIG. 24A. Similarly, when a negative offset is given to the digital torque waveform before correction indicated by the solid line c in FIG. 24A, the corrected digital torque waveform is indicated by an alternate long and short dash line c2 in FIG. 24A.

Figure 24B:
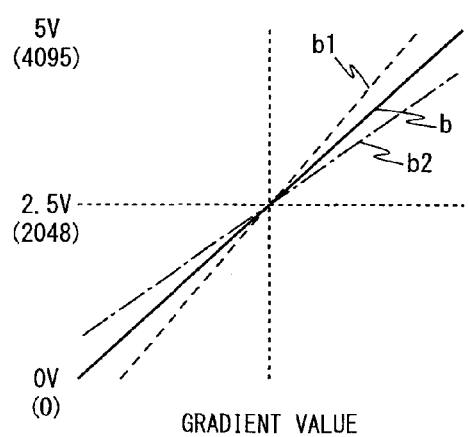

Moreover, a positive gradient is given to the digital torque waveform before correction indicated by a solid line b in FIG. 24B, the corrected digital torque waveform is indicated by a dashed line b1 in FIG. 24B. Similarly, when a negative offset is given to the digital torque waveform before correction indicated by the solid line b in FIG. 24B, the corrected digital torque waveform is indicated by an alternate long and short dash line b2 in FIG. 24B.

Note that FIG. 24A and FIG. 24B illustrate the case where the output voltage at a middle point is 2.5 V in 0-5 V system.

In the present embodiment, in order to keep uniformity of the torque property of the torque sensing device 30, the A/D conversion unit 55 converts an analog torque signal output from the noise rejection filter 54 to a digital torque signal, so that the torque calculation unit 56 adjusts the gain and the offset for the digital torque signal.

A numerical value in parentheses ( ) along the vertical axis in FIG. 24A and FIG. 24B illustrates a value in 12 bits when converted by the A/D conversion unit 55.

That is, in the production process etc., the A/D converter converts the analog torque signal to the digital value for the digital torque waveform beforehand. Afterwards, an offset and a gradient (gain) for a desired torque waveform are calculated based on this digital torque waveform before correction. An offset correction value and a gradient correction value for correction are then calculated and stored in the correction value memory unit 58.

Then, the torque calculation unit 56 corrects an AD output value, which is an output signal from the A/D conversion unit 55, using the offset correction value and the gradient correction value stored in the correction value memory unit 58. The corrected AD output value is output to the electric motor control unit 57 as a torque detecting signal.

Figure 25:
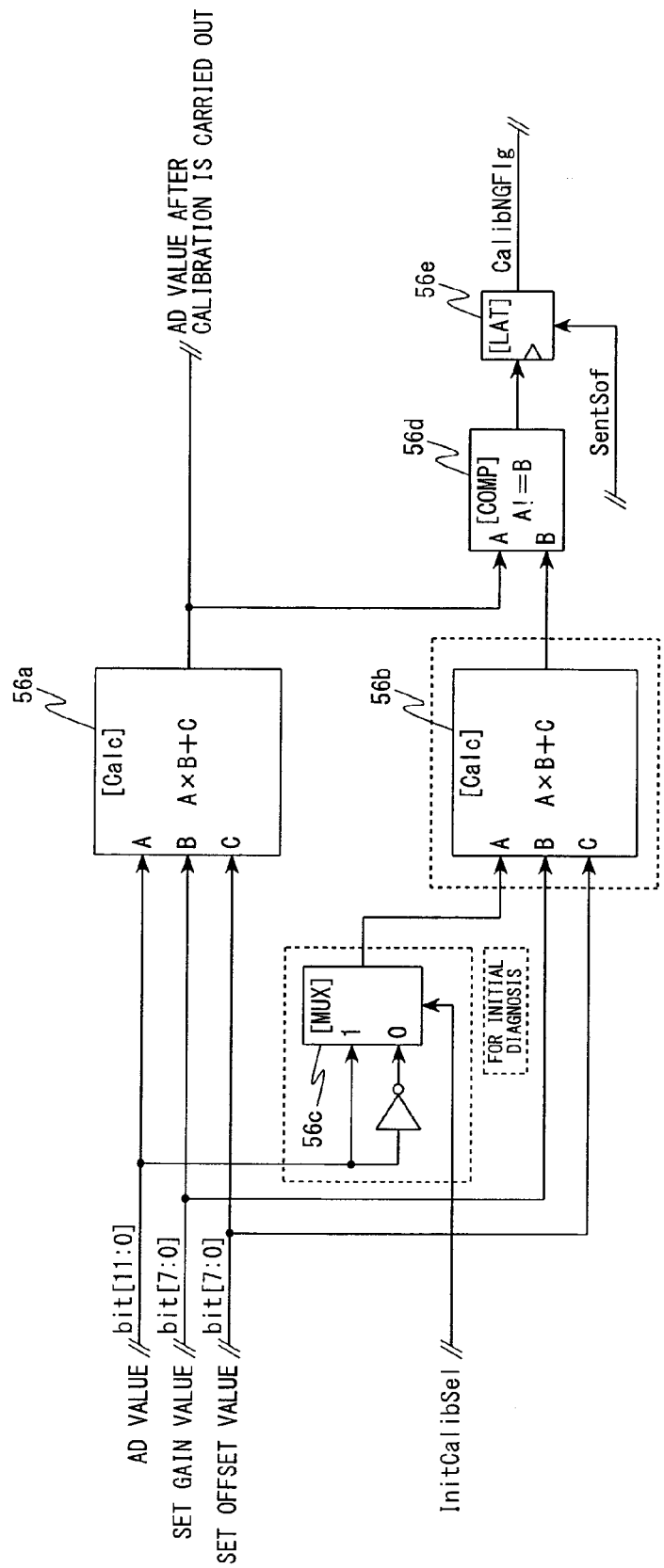
FIG. 25 is a block diagram of a configuration of a torque calculation unit.

FIG. 25 is a block diagram of a configuration of the torque calculation unit 56.

As illustrated in FIG. 25, the torque calculation unit 56 is provided with a calculation unit (first correction and calculation unit) 56a. The calculation unit 56a receives an AD output value (AD value) output from the A/D conversion unit 55 and the gradient correction value (set gain value) and the offset correction value (set offset value) stored in the correction value memory unit 58.

The calculation unit 56a calculates for correction of the AD value before correction using the set gain value and the set offset value. More specifically, the corrected AD output value will be obtained through calculation of: "the AD value before correction"×"the set gain"+"the set offset". As such, since there is provided a correction and calculation logic for correcting the gain and the offset of the AD output value based on the set gain value and the set offset value stored beforehand, it is possible to keep the torque property uniformly without carrying out a trimmer adjustment.

Moreover, in order to provide a more reliable system, the correction and calculation logic is configured as a duplex system, and either of them calculates in the same way. Furthermore, there is provided a monitoring function (correction logic monitoring unit) for comparing the calculated results and monitoring abnormality of the correction and calculation logic regularly. When the calculated results from the duplex system are the same (or the difference between the calculated results falls within a predetermined range), it is determined that the correction and calculation logic is normal.

That is, the torque calculation unit 56 is provided with the calculation unit (second correction and calculation unit) 56b for performing the same computing process as the calculation unit 56a. The calculation unit 56b receives an output from a multiplexer (MUX) 56c as an AD value before correction. The MUX 56c receives a selection signal (InItCalibSel) to be "1" in a normal state, and the AD output value output from the A/D conversion unit 55 is then input as the AD value before correction.

A comparator 56d compares the calculated result from the calculation unit 56a to that from the calculation unit 56b, and the resulting value is then latched by a latch circuit 56e. The comparator 56d outputs "0" when both are the same, whereas it outputs "1" when they are different. The signal latched by the latch circuit 56e is output as an abnormality detection flag (CalibNGFlg) at a predetermined timing.

When this abnormality detection flag is "0", the correction and calculation logic is normal. Therefore, the corrected AD output value obtained through the calculation by the calculation unit 56a is employed and output to the electric motor control unit 57. The torque detecting function continues in this manner. On the other hand, when the abnormality detection flag is "1", the abnormality processing, such as halting the torque detecting function, is carried out. This allows the prevention of the torque calculation unit 56 from outputting the torque detecting signal with low-reliability.

Furthermore, the torque calculation unit 56 has an initial diagnostic function (initial diagnostic unit) for determining beforehand whether or not the monitoring function of the correction and calculation logic is functioning normally. Different signals are input to the calculation units 56a and 56b, respectively to determine that both comparison results differ from each other. This allows the determination that the monitoring function of the correction and calculation logic is functioning normally.

Specifically, a selection signal (InItCalibSel) to be "0" is input to the MUX 56c at the time of the initial diagnosis, and an inversion signal of the AD output value output from the A/D conversion unit 55 is input to the calculation unit 56b as an AD value before correction. On the other hand, the AD output value output from the A/D conversion unit 55 is input to the calculation unit 56a without change.

The comparator 56d compares the calculated result from the calculation unit 56a to that from the calculation unit 56b, so as to determine that an abnormality detection flag (CalibNGFlg) to be "1" is output and to determine that the correction and calculation logic is functioning normally.

This initial diagnosis starts, for example, immediately after the power is turned on (or immediately after the ignition switch 18 is turned on) and before the controller 15 starts the steering auxiliary control.

Note that the case where an abnormal signal (inversion signal of the input signal of the calculation unit 57a) is input to the calculation unit 56b at the time of the initial diagnosis has been explained. However, the above-mentioned abnormal signal and normal signal (input signals of the calculation unit 57a) may be input to the calculation unit 56b alternately. Furthermore, the normal signal may be input again after the normal signal and the abnormal signal are input. In this case, it is determined that the abnormality detection flag (CalibNGFlg) to be "0" is output, when the normal signal is input, and that the abnormality detection flag (CalibNGFlg) to be "1" is output, when an abnormal signal is input, so as to confirm that the correction and calculation logic is operating normally.

Referring back to FIG. 23, the electric motor control unit 57 supplies to the electric motor 12 a drive current Ic for generating a steering auxiliary torque to reduce the steering torque given by a driver, based on the calculated result from the torque calculation unit 56.

Meanwhile, a technique of using a trimmer to make gain and offset adjustment for an analog signal is generally used as the technique for keeping uniform torque property of the coil type torque sensor. However, in this case, the more the number of parts increases due to installation of a trimmer, the more skillful operations for the trimmer adjustment in the production process is necessitated. Moreover, since the temperature characteristics are generally large, they control the temperature characteristics of the signal processing circuit greatly.

On the other hand, as mentioned above, it is possible to make the torque property stable according to the present embodiment, without using the trimmer. Therefore, the reduced number of parts and costs due to elimination of the trimmer are achievable. At the same time, in the improved temperature characteristics of the signal processing circuit is also achievable.

Moreover, since the set gain value and the set offset value are stored beforehand in the memory unit, it is possible to adjust the gain and the offset of the digital torque signal through simple calculation, and appropriate torque property is obtainable.

Furthermore, the calculation logic is configured as a duplex system, and it has a monitoring function for always monitoring an abnormality of the calculation logic through the comparison. This halts the torque detecting function etc., when an abnormality occurs in the calculation logic. Therefore, it is possible to output only a reliable torque detecting signal. Moreover, since the same signal is input to two calculation logics to determine whether or not the both calculation results are the same, it is possible to confirm appropriately using a comparatively simple technique that the calculation logic is functioning normally.

Moreover, an initial diagnostic function is also provided for determining in advance whether or not the above-mentioned monitoring function is functioning normally. When the calculation logic configured as a duplex system receives different signals, respectively, and the comparison results differ from each other, it is determined that the monitoring function is functioning normally. In this manner, since it is possible to determine appropriately that the monitoring function is functioning normally, a more reliable torque detecting signal is provided.

Furthermore, for initial diagnosis, an inversion signal of the signal input to one calculation logic is input to the other calculation logic. Therefore, an abnormal signal may be generated relatively easily, and initial diagnosis may be carried out with a simple configuration.

Sixth Embodiment

A sixth embodiment of the present invention will be described below.

The sixth embodiment is different from the first embodiment in the configuration of the torque detecting device 30, but has a function of outputting diagnostic information to the ECU.

Figure 26:
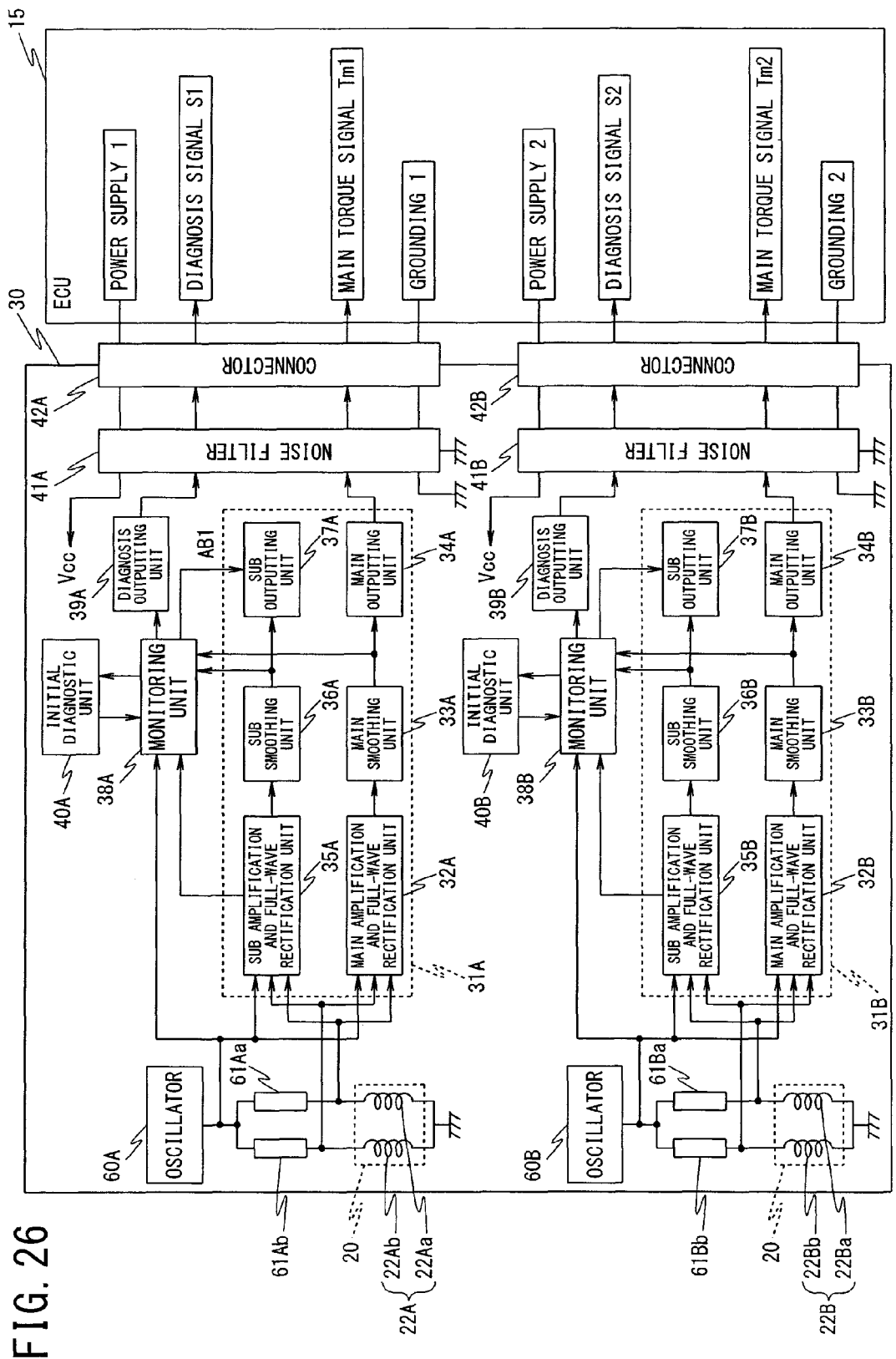
FIG. 26 is a block diagram of a configuration of a torque detecting device according to a sixth embodiment.

FIG. 26 is a block diagram of a configuration of the torque detecting device 30.

The output signals from the coil pair 22A are terminal voltages of the coil 22Aa and 22Ab while output signals from the coil pair 22B are terminal voltages of the coil 22Ba and 22Bb. These output signals are output to the signal processing circuits 31A and 31B, respectively.

The first torque detection system of the torque detecting device 30 is provided with the signal processing circuit 31A, a monitoring unit (torque signal monitoring unit) 38A, a diagnosis outputting unit 39A, an initial diagnostic unit 40A, a noise filter 41A, and a connector 42A. The signal processing circuit 31A is provided with the main amplification and full-wave rectification unit 32A, the main smoothing unit 33A, the main outputting unit 34A, the sub amplification and full-wave rectification unit 35A, the sub smoothing unit 36A, and the sub outputting unit 37A.

Moreover, the second torque detection system of the torque detecting device 30 is provided with the signal processing circuit 31B, the monitoring unit (torque signal monitoring unit) 38B, the diagnosis outputting unit 39B, the initial diagnostic unit 40B, the noise filter 41B, and the connector 42B as in the first system. The signal processing circuit 31B is equipped with the main amplification and full-wave rectification unit 32B, the main smoothing unit 33B, the main outputting unit 34B, the sub amplification and full-wave rectification unit 35B, the sub smoothing unit 36B, and the sub outputting unit 37B.

The torque detecting device 30 is connected to the controller (ECU) 15 via the connectors 42A and 42B.

The ECU 15 supplies the supply voltage Vcc to each element of the torque detecting device 30 via the connectors 42A and 42B and the noise filters 41A and 41B. On the other hand, the torque detecting device 30 processes the output signals from the coil pairs 22A and 22B, and then outputs them to the ECU 15 the main torque signals Tm1 and Tm2, described later, and diagnosis signals S1 and S2. The ECU 15 determines based on various input signals whether or not an abnormality occurs in the torque detecting device 30, and carries out the steering auxiliary control in response to the determination result.

Hereinafter, a specific configuration of the torque detecting device 30 will be explained. Since the first and the second torque detection system of the torque detecting device 30 have the same configuration, only the first torque detection system will be described as an example herein.

The main amplification and full-wave rectification unit 32A receives the output signals from the coil pair 22A (terminal voltages of the coils 22Aa and 22Ab), and then amplifies and rectifies the difference between these two input voltages. The main smoothing unit 33A smoothes the output wave from the main amplification and full-wave rectification unit 32A. The main outputting unit 34A then outputs the resulting smoothed signal to the ECU 15, as the main torque signal Tm via the noise filter 41A and the connector 42A.

Similarly, the sub amplification and full-wave rectification unit 35A receives the output signals from the coil pair 22A (terminal voltages of the coils 22Aa and 22Ab), and amplifies and rectifies the difference between these two input voltages. The sub smoothing unit 36A smoothes the output waveform from the sub amplification and full-wave rectification unit 35A. The sub outputting unit 37A outputs the smoothed signal to the ECU 15 as the sub torque signal Ts via the noise filter 41A and the connector 42A. Moreover, the output waveform from the sub amplification and full-wave rectification unit 35A is also input to the monitoring unit 38A, to be described later.

The monitoring unit 38A detects a contact failure between the coil 22Aa and the electrical resistor 61Aa and between the coil 22Ab and the electrical resistor 61Ab, for example, by finding a change in differential voltage of a bridged circuit, and detects an abnormality of the circuit system based on the phase difference from a reference voltage (sine wave), not illustrated, which is supplied from the ECU 15. That is, the monitoring unit 38A detects the phase difference between the waveform of an applied alternating current signal and the waveform of the differential voltage from the bridge circuit. When the phase difference exceeds a predetermined value, the monitoring unit 38A determines that a coil, an electric resistor, or a circuit has an abnormality.

Moreover, in addition to the signal processing circuit 31A carrying out the abnormality detection processing, the monitoring unit 38A monitors abnormality of the signal processing circuit 31A by comparing the main torque signal Tm1 output from the main smoothing unit 33A to the sub torque signal Ts1 output from the sub smoothing unit 36A. When an abnormality occurs, an abnormal signal AB1 is output to the sub outputting unit 37A.

At this time, the sub outputting unit 37A receives the abnormal signal AB1 from the monitoring unit 38A, described later, and sets the sub torque signal Ts1 to 0.

The diagnosis outputting unit 39A generates a diagnosis signal S1, which indicates diagnostic information of the monitoring unit 38A, and outputs it to the ECU 15 via the noise filter 41A and the connector 42A.

The initial diagnostic unit 40A starts the operations immediately after the power is turned on (or ignition switch 18 is turned on) and before the ECU 15 starts the steering auxiliary control, and carries out initial diagnosis of whether or not the monitoring unit 38A is operating normally.

Once the initial diagnostic unit 40A starts initial diagnosis, it inputs a normal signal and an abnormal signal alternately to the monitoring unit 38A as initial diagnosis signals, and confirms that the monitoring unit 38A is operating normally. In this situation, after the normal signal and the abnormal signal, the normal signal may be input once again. Herein, the normal signal denotes a signal that makes the abnormality detection result from the monitoring unit 38A, which is functioning normally, "normal" when abnormality detection is performed using the normal signal. On the other hand, the abnormal signal denotes a signal that makes the abnormality detection result from the monitoring unit 38A, which is functioning normally, "abnormal" when abnormality detection is performed using the abnormal signal.

That is, the main torque signal Tm1 and the diagnosis signal S1 are output to the ECU 15 from the signal processing circuit 31A, while the main torque signal Tm2 and the diagnosis signal S2 are output to the ECU 15 from the signal processing circuit 31B.

Figure 27A:
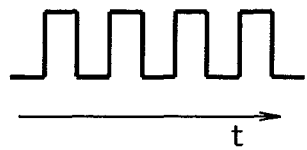
FIG. 27A to FIG. 27C are graphs illustrative of diagnosis signals S1 and S2.

The diagnosis signals S1 and S2 are a fixed cycle pulse signal illustrated in FIG. 27A when the monitoring units 38A and 38B have not detected an abnormality or it is in the normal state. Otherwise, when the initial diagnostic units 40A and 40B are conducting respective initial diagnoses of the monitoring units 38A and 38B, they are a fixed, low level signal illustrated in FIG. 27B. Furthermore, when the monitoring units 38A and 38B detect an abnormality or it is in an abnormal state, they are a fixed, high level signal illustrated in FIG. 27C. Moreover, as illustrated in FIG. 28A to FIG. 28C, the main torque signal Tm1 and the main torque signal Tm2 have characteristics in that one of them increases due to torque as the other thereof decreases, accordingly.

The ECU 15 compares the main torque signal Tm1 to the main torque signal Tm2, and determines whether or not an abnormality occurs in the torque detecting device 30 based on whether it deviates from the normal crossing characteristics.

The ECU 15 determines that the torque detecting device 30 is normal, based on the main torque signals Tm1 and Tm2. When the diagnosis signals S1 and S2 are pulse signals as illustrated in FIG. 27A, the ECU 15 carries out regular, the steering auxiliary control using the main torque signal Tm1 output from the signal processing circuit 31A, so as to drive the electric motor 12.

Figure 27B:
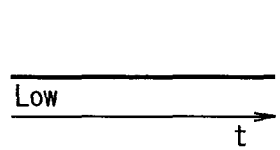
Figure 28A:
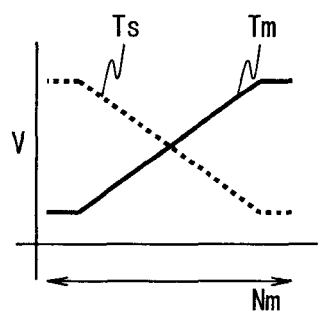
FIG. 28A to FIG. 28C are graphs illustrative of torque signals Tm1 and Tm2.
Figure 28B:
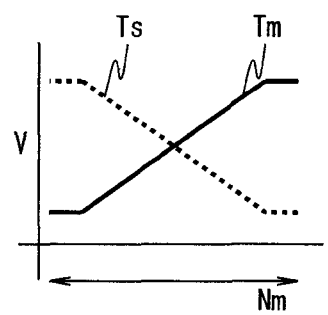
Figure 28C:
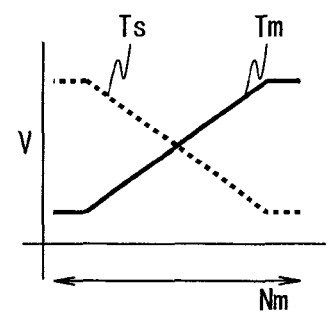

On the other hand, when the diagnosis signals S1 and S2 are low level signals as illustrated in FIG. 27B, the ECU 15 determines that the initial diagnostic units 40A and 40B are conducting initial diagnosis, and prevents the steering auxiliary control from being started.

Moreover, the ECU 15 determines that an abnormality occurs in the torque detecting device 30, based on the main torque signals Tm1 and Tm2. When either diagnosis signal S1 or S2 is a high level signal as illustrated in FIG. 27C, regularly, the steering auxiliary control is carried out using the main torque signal output from an abnormality-free torque detection system, thereby driving the electric motor 12.

Figure 27C:
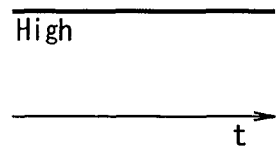

Note that when both of the diagnosis signals S1 and S2 are a high level signal as illustrated in FIG. 27C, the ECU 15 drives the electric motor 12 using a past normal torque value, so as to decrease assist gradually, thereby entering a fail-safe mode in which the assist is halted safely.

Meanwhile, in the case of the torque sensor system having duplex torque detection systems, the ECU side necessitates signal processing for two systems. In particular, when duplex of processing circuits output two kinds of signals including: the main torque signal; and the sub torque signal, the ECU side has to process four kinds of signals altogether. This necessitates double processing as compared to the single torque detection system. Moreover, when the signal output is an analog output, the ADC on the ECU side will be needed to accept the double processing. Two ADCs may be needed depending on the processing capability. As such, a larger load will be imposed on the control circuit of the ECU for signal processing, which adversely affect the processing capability, leading to the increased cost.

On the other hand, according to the present embodiment, since a single kind of analog signal is output from each of the two systems, the ECU 15 will be needed to process only two signals. The torque detection system that outputs two kinds of analog signals should thus be the same in the processing capability as a single system. Therefore, another provision of the ADC is unnecessary.

Moreover, since a single main torque signal is output from each system, it is possible to monitor abnormality between the systems by comparing the main torque signals Tm1 and Tm2 from respective systems. Thus, an abnormality of sensors is detectable through comparison of two signals without making the signal processing complicated.

Furthermore, when the above-mentioned comparison result points out that an abnormality is occurring, which system has an abnormality may be identified based on the diagnosis signals S1 and S2 output from each system. Therefore, even if either one system or the other has an abnormality, it is made possible to continue the function of the torque sensor due to the system discrimination, which allows establishment of a more secure, redundant torque sensor system.

Furthermore, since the diagnosis signals S1 and S2 are output from each system as simple signals, it is made possible to detect a system having an abnormality using a simple method without imposing a heavy load on the ECU side.

(Applications)

While the aforementioned embodiments have two sets of coil pairs, the number of coil pairs may be three or more in each embodiment described above.

Moreover, in each embodiment described above, the case of using the coil-type torque sensor has been explained. However, a configuration using a magnetic induction element etc. that outputs two torque signals is also applicable.

INDUSTRIAL APPLICABILITY

Since the torque detecting device according to the present invention is provided with two systems or more coil pairs, oscillation units, and signal processing circuits, and the magnetization frequency difference is set to 3.5 KHz or higher, a component superimposed on the torque signal due to magnetic flux interference generated from each coil can be attenuated effectively. Therefore, a highly accurate and stable torque signal is obtainable.

As a result, an electric power steering device provided with the aforementioned torque detecting device is capable of performing stable steering auxiliary control, which is effective.

REFERENCE SIGNS LIST

1 steering wheel
2 steering shaft
10 steering auxiliary mechanism
11 reduction gear
12 electric motor
15 controller
16 speed sensor
17 battery
18 ignition switch
20 torque sensor
22A first coil pair
22Aa, 22Ab, 22Ba, 22Bb Coil
22B second coil pair
30 torque detecting device
32A, 32B main amplification and full-wave rectification unit
33A, 33B main smoothing unit
34A, 34B main outputting unit
35A, 35B sub amplification and full-wave rectification unit
36A, 36B sub smoothing unit
37A, 37B sub outputting unit
38A, 38B monitoring unit
39A, 39B diagnosis outputting unit
40A, 40B initial diagnostic unit
41A, 41B noise filter
42A, 42B connector,
51A, 51B differential amplifier
52A, 52B rectification and smoothing circuit
53A, 53B low-pass filter
54A, 54B noise rejecting filter
55 A/D conversion unit
56 torque calculation unit
56a calculation unit (first correction and calculation unit)
56b calculation unit (second correction and calculation unit)
56c MUX
56d comparator
56e latch circuit
57 motor control unit
58 correction value correcting unit
59A, 59B signal processing circuit
60A, 60B magnetization signal generating unit
61Aa, 61Ab, 61Ba, 61Bb electric resistance
62A, 62B CLK
63A, 63B counter
64A, 64B abnormality detector
65A, 65B clock monitoring unit
65Aa counter
65Ab, 65Ac comparator
65Ad OR circuit
66A, 66B CR oscillator
67A, 67B CR pulse-width memory unit
68 low-pass filter
69 clock frequency change monitoring unit
69a voltage divider
69b window comparator
69c logic circuit
71A, 71B monitoring unit diagnosing unit
72A, 72B clock signal selecting circuit
SWa to SWc switch
73a to 73c frequency divider
75U, 75L Counter
76U, 76L OR gate
77U, 77L latch circuit
78U, 78L determination timing generating circuit
79U, 79L AND gate
140 signal processing circuit
160 diagnostic device
161 magnetization pulse monitoring unit
162 magnetization signal monitoring unit
162a input terminal
162b, 162c comparator
162d, 162e counter circuit
162f, 162g comparator
162h OR circuit
162i latch circuit 162*j* determination timing generation section
162*k* AND circuit
162*k* AND circuit
163 phase monitoring unit
163*a* to 163*c* comparator
163*d* AND circuit
163*e* input terminal
163*f* phase shift circuit
164 differential amplitude monitoring unit
165 MUX/ADC monitoring unit
165*a* MUX
165*b* ADC
165*c* latch circuit
165*d* comparator
165*e* OR circuit
165*f* latch circuit
165*g* determination timing generating unit
166 torque signal monitoring unit
167 communication monitoring unit

The invention claimed is:

1. A torque detecting device comprising:
at least two sets of coil pairs for detecting a relative displacement between a first rotary shaft and a second rotary shaft, which are connected to each other via a torsion bar that generates a twist due to an input torque, by corresponding the relative displacement to a change in impedance;
a plurality of oscillators, independently provided for each of the coil pairs, each for supplying a magnetization signal with a different magnetization frequency to each of the coil pairs, and
a signal processing unit, independently provided for each of the coil pairs, each having a torque detection function for processing an output signal from each of the coil pairs and outputting a torque detection signal,
wherein a magnetization frequency difference, which is a difference between the magnetization frequencies, is set to 3.5 kHz or higher.

2. The torque detecting device according to claim 1, wherein:
the magnetization frequency difference is set to a value greater than a maximum value within a frequency band of the torque signal detected, and
the signal processing unit intercepts passage of a frequency corresponding to the magnetization frequency difference, and comprises a low-pass filter for allowing the passage of a frequency corresponding to the maximum value.

3. The torque detecting device according to claim 1, further comprising:
a monitoring unit for monitoring an abnormality of the torque detection function regularly; and
an initial diagnostic unit for inputting a diagnosis signal to the monitoring unit and determining that the monitoring unit is operating normally before the torque detection function starts its operation.

4. The torque detecting device according to claim 3, wherein the initial diagnostic unit inputs to the monitoring unit a normal signal and an abnormal signal alternately, as diagnosis signals, and determines that the monitoring unit is operating normally when the monitoring unit carries out a normality diagnosis in response to an input of the normal signal, and the monitoring unit carries out an abnormality diagnosis in response to the input of the abnormal signal.

5. The torque detecting device according to claim 4, wherein the initial diagnostic unit inputs to the monitoring unit, the normal signal, the abnormal signal, and the normal signal in this order as diagnosis signals.

6. The torque detecting device according to claim 3, wherein:
the monitoring unit is a magnetization signal monitoring unit for monitoring a waveform of the magnetization signal; and
the initial diagnostic unit inputs a normal signal with an ideal waveform of the magnetization signal, and an abnormal signal different in frequency from the normal signal as diagnosis signals for the magnetization signal monitoring unit instead of the magnetization signal to be monitored.

7. The torque detecting device according to claim 6, wherein the initial diagnostic unit inputs as the abnormal signal, a signal with a half the frequency of the normal signal.

8. The torque detecting device according to claim 3, wherein:
the monitoring unit is a phase monitoring unit for monitoring whether or not the torque detection signal has a phase shifted relative to the magnetization signal; and
the initial diagnostic unit inputs as the diagnosis signals for the phase monitoring unit, the magnetization signal and a signal having a phase of the magnetization signal is shifted via a phase shift circuit, instead of the torque detection signal to be monitored.

9. The torque detecting device according to claim 3, wherein:
the signal processing unit is configured to A/D convert the torque detection signal to be output,
the monitoring unit is an ADC monitoring unit for monitoring an output value from an A/D converted voltage value to be monitored, and
the initial diagnostic unit inputs as diagnosis signals for the ADC monitoring unit, a plurality of normal voltage values including a central voltage value within a regularly used voltage region of the torque detection signal and a plurality of abnormal voltage values different from the normal voltage value, instead of the voltage value to be monitored.

10. The torque detecting device according to claim 3, wherein:
each of the oscillators includes a counter for dividing a frequency of a clock signal to generate a pulse with the magnetization frequency, and
the monitoring unit comprises a CR oscillator and a pulse width memory unit for calculating a width of an output pulse of the CR oscillator using the clock signal, and is a clock monitoring unit for monitoring the abnormality of the clock signal by calculating the width of the output pulse of the CR oscillator using the clock signal and comparing the calculated value to the width of the output pulse stored in the pulse width memory unit.

11. The torque detecting device according to claim 10, wherein the initial diagnostic unit determines that the clock monitoring unit is operating normally, when the clock monitoring unit inputs as the diagnosis signals for the clock monitoring unit, the pulse of the magnetization frequency generated by the counter instead of the clock signal to be monitored, counts width of the output pulse from the CR oscillator using the pulse of the magnetization frequency generated by the counter, and compares the resulting counted value to width of an output pulse stored in the pulse width memory unit, and diagnoses the abnormality.

12. The torque detecting device according to claim 3, wherein:
- the oscillators each generate the magnetization signal with a sinusoidal waveform for the coil pair, based on the clock pulse, and
- the monitoring unit comprises a low-pass filter for monitoring, which inputs the magnetization signal output from the oscillation unit, and is a clock frequency change monitoring unit for detecting a change in amplitude of an output from the low-pass filter as the change in the frequency of the clock pulse.

13. The torque detecting device according to claim 12, wherein the clock frequency change monitoring unit has a configuration for detecting whether or not at least either a peak value along an upper half wave or a lower half wave of the output from the low-pass filter for monitoring falls within a normal amplitude range.

14. The torque detecting device according to claim 13, wherein the initial diagnostic unit comprises a clock frequency selecting unit for selecting and supplying a regular clock signal and an abnormal clock signal different in magnetization frequency from the regular clock signal to the magnetization signal generating unit, and
- wherein the clock frequency change monitoring unit is diagnosed based on the detected and output result from the clock frequency change monitoring unit, when the regular clock signal and the abnormal clock signal are supplied as the diagnosis signals for the clock frequency selecting unit to the magnetization signal generating unit.

15. The torque detecting device according to claim 14, wherein the abnormal clock signal includes two kinds of signals: an abnormal high frequency clock signal with a frequency higher than a highest permissible frequency of the regular clock signal; and an abnormal low frequency clock signal with the frequency lower than a lowest permissible frequency for the regular clock signal.

16. The torque detecting device according to claim 3, wherein the signal processing unit further comprises:
- an AD converter for converting an analog signal corresponding to the torque to a digital signal;
- a memory unit for storing beforehand a gain correcting value and an offset correcting value for correcting a gain and an offset for the digital signal converted by the AD converter;
- a first correction and calculation unit for correcting the digital signal converted by the AD converter based on the gain correcting value and the offset correcting value stored in the memory unit, and outputting the corrected value as the torque detection signal; and
- a second correction and calculation unit for performing the same correcting operation as that of the first correction and calculation unit,
- wherein the monitoring unit is an operating logic monitoring unit for inputting the same signal to the first and second correction and calculation units, and comparing both calculated results to monitor whether or not the operating logic of the first correction and calculation unit is functioning normally.

17. The torque detecting device according to claim 16, wherein the initial diagnostic unit determines that the calculation logic monitoring unit is functioning normally by inputting to the second correction and calculation unit a signal different from the signal input to the first correction and calculation unit as a diagnosis signal, and determining that the calculated results differ.

18. The torque detecting device according to claim 17, wherein the initial diagnostic unit uses an inverted signal of the input signal to the first correction and calculation unit as a different signal to be input to the second correction and calculation unit from that to be input to the first correction and calculation unit.

19. The torque detecting device according to claim 3, wherein the signal processing unit is provided to correspond to two sets of coil pairs, is configured to output a main torque signal based on each of the output signals from the two sets of coil pairs, respectively, and comprises a diagnostic information output unit for outputting diagnostic information including the abnormality diagnosis result from the monitoring unit.

20. The torque detecting device according to claim 19, wherein:
- the signal processing unit is configured to calculate a main torque signal and the sub torque signal based on output signals from the coil pairs and to output only the main torque signal, and
- the monitoring unit is a torque signal monitoring unit for monitoring an abnormality of the signal processing unit by comparing the main torque signal to the sub torque signal.

21. The torque detecting device according to claim 19, wherein
the diagnostic information output unit outputs as the diagnostic information at least three kinds of information including: information that the abnormality diagnosis result from the monitoring unit is normal; information that the abnormality diagnosis result from the monitoring unit is abnormal; and information that the initial diagnostic unit is conducting an initial diagnosis.

22. The torque detecting device according to claim 21, wherein the diagnostic information output unit outputs as the diagnostic information, a pulse signal with a fixed period when the abnormality diagnosis result from the monitoring unit is normal, a high level signal when the abnormality diagnosis result from the monitoring unit is abnormal, and a low level signal when the initial diagnostic unit is conducting initial diagnosis.

23. The torque detecting device according to claim 1, wherein the signal processing unit further comprises:
- an AD converter for converting an analog signal corresponding to the torque to a digital signal;
- a memory unit for storing beforehand a gain correcting value and an offset correcting value for correcting a gain and an offset for the digital signal converted by the AD converter; and
- a first correction and calculation unit for correcting the digital signal converted by the AD converter based on the gain correcting value and the offset correcting value stored in the memory unit, and outputting the corrected value as the torque detection signal.

24. An electric power steering device, comprising:
the torque detecting device of claim 1 for detecting a steering torque input to a steering mechanism; and
a motor control unit for drive-controlling an electric motor to supply to a steering system a steering auxiliary power that reduces a driver's steering burden, based on at least a steering torque detected by the torque detecting device.

* * * * *